(12) United States Patent
Famaey

(10) Patent No.: US 11,477,262 B2
(45) Date of Patent: Oct. 18, 2022

(54) REQUESTING MULTIPLE CHUNKS FROM A NETWORK NODE ON THE BASIS OF A SINGLE REQUEST MESSAGE

(71) Applicants: Koninklijke KPN N.V., Rotterdam (NL); IMEC VZW, Leuven (BE); UNIVERSITEIT GENT, Ghent (BE)

(72) Inventor: Jeroen Famaey, Zwijndrecht (BE)

(73) Assignees: KONINKLIJKE KPN N.V., Rotterdam (NL); Universiteit Gent, Ghent (BE); IMEC VZW, Leuven (BE)

( * ) Notice: Subject to any disclaimer, the term of this patent is extended or adjusted under 35 U.S.C. 154(b) by 160 days.

(21) Appl. No.: 15/115,857

(22) PCT Filed: Feb. 12, 2015

(86) PCT No.: PCT/EP2015/052950
§ 371 (c)(1),
(2) Date: Aug. 1, 2016

(87) PCT Pub. No.: WO2015/121342
PCT Pub. Date: Aug. 20, 2015

(65) Prior Publication Data
US 2017/0171287 A1 Jun. 15, 2017

(30) Foreign Application Priority Data

Feb. 13, 2014 (EP) .................................. 14155014
Jun. 25, 2014 (EP) .................................. 14173839

(51) Int. Cl.
*H04L 67/02* (2022.01)
*H04N 21/845* (2011.01)
(Continued)

(52) U.S. Cl.
CPC ............ *H04L 67/02* (2013.01); *H04L 65/612* (2022.05); *H04L 65/65* (2022.05); *H04L 65/764* (2022.05);
(Continued)

(58) Field of Classification Search
USPC .................. 709/201–203, 218, 227–229, 231
See application file for complete search history.

(56) References Cited

U.S. PATENT DOCUMENTS 6,553,376 B1 4/2003 Lewis et al.
7,289,519 B1 10/2007 Liskov
(Continued)

FOREIGN PATENT DOCUMENTS

EP 2 116 939 11/2009
EP 2 131 362 A1 12/2009
(Continued)

OTHER PUBLICATIONS

3GPP TS 26.247, 3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH), 3GPP Standard; 3GPP TS 26.247, 3rd Generation Partnership Project, vol. SA WG4, No. V12.1.0 (2013).
(Continued)

*Primary Examiner* — Younes Naji
(74) *Attorney, Agent, or Firm* — Hamilton, Brook, Smith & Reynolds, P.C.

(57) ABSTRACT

A method for requesting a plurality of chunks by a streaming client on the basis of a single request message is described, wherein said chunks are defined on the basis of a manifest file comprising chunk identifiers for determining at least one delivery node for delivering chunks defined by said chunk identifiers to said client, wherein said method comprises:
(Continued)

determining on the basis of said manifest file a first request message for requesting a first plurality of chunks, said first request message comprising one or more first chunk template parameters and a first chunk template, preferably an URL chunk template, comprising one or more chunk template parameters fields; sending said first request message to a first network node, wherein said first network node is configured for determining a first plurality of chunk identifiers, preferably a first plurality of URLs, associated with said first plurality of chunks on the basis of said first chunk template and said one or more first chunk template parameters; and, receiving at least one response message comprising a chunk associated with one of said chunk identifiers that were determined on the basis of said first chunk template and said one or more first chunk template parameters.

24 Claims, 16 Drawing Sheets

(51) Int. Cl.
    *H04N 21/854*     (2011.01)
    *H04N 21/262*     (2011.01)
    *H04N 21/2343*     (2011.01)
    *H04L 65/65*     (2022.01)
    *H04L 65/612*     (2022.01)
    *H04L 65/75*     (2022.01)
    *H04L 67/146*     (2022.01)
    *H04L 65/80*     (2022.01)

(52) U.S. Cl.
    CPC ..... *H04L 67/146* (2013.01); *H04N 21/23439* (2013.01); *H04N 21/26258* (2013.01); *H04N 21/8456* (2013.01); *H04N 21/85406* (2013.01); *H04L 65/75* (2022.05); *H04L 65/80* (2013.01)

(56) References Cited

U.S. PATENT DOCUMENTS

| | | | |
|---|---|---|---|
| 8,190,677 B2 * | 5/2012 | Myers | H04N 21/435 |
| | | | 709/231 |
| 9,143,543 B2 | 9/2015 | Falvo | |
| 9,271,021 B2 | 2/2016 | Adimatyam | |
| 9,380,092 B2 | 6/2016 | Patel | |
| 9,635,077 B2 * | 4/2017 | Swaminathan | H04L 65/65 |
| 9,614,579 B2 | 5/2017 | Gouache | |
| 9,826,016 B2 | 11/2017 | Petrangali et al. | |
| 10,171,528 B2 | 1/2019 | Wissingh et al. | |
| 10,225,306 B2 | 3/2019 | van Deventer et al. | |
| 10,523,723 B2 | 12/2019 | Famaey et al. | |
| 10,609,101 B2 | 3/2020 | Wissingh et al. | |
| 2003/0097443 A1 | 5/2003 | Gillet | |
| 2003/0142670 A1 | 7/2003 | Gould et al. | |
| 2004/0010613 A1 | 1/2004 | Apostolopolous et al. | |
| 2004/0049579 A1 | 3/2004 | Ims | |
| 2004/0078293 A1 | 4/2004 | Iverson et al. | |
| 2004/0162787 A1 | 8/2004 | Madison | |
| 2005/0071881 A1 | 3/2005 | Deshpande | |
| 2005/0265345 A1 | 12/2005 | Chen et al. | |
| 2007/0038873 A1 | 2/2007 | Oliveira | |
| 2007/0242666 A1 | 10/2007 | Barrett | |
| 2008/0189429 A1 | 8/2008 | DaCosta | |
| 2009/0094322 A1 | 4/2009 | Uno et al. | |
| 2009/0113024 A1 | 4/2009 | Verma | |
| 2009/0292819 A1 | 11/2009 | Kandekar et al. | |
| 2009/0313330 A1 | 12/2009 | Sakamoto | |
| 2010/0011061 A1 | 1/2010 | Hudson | |
| 2010/0161756 A1 | 6/2010 | Lewis et al. | |
| 2010/0169458 A1 | 7/2010 | Biderman et al. | |
| 2010/0226372 A1 | 9/2010 | Watanabe | |
| 2010/0241757 A1 | 9/2010 | Hu et al. | |
| 2010/0299443 A1 | 11/2010 | Hu et al. | |
| 2011/0066673 A1 | 3/2011 | Outlaw | |
| 2011/0082924 A1 | 4/2011 | Gopalakrishnan | |
| 2011/0145303 A1 | 6/2011 | Boldyrev | |
| 2011/0225371 A1 | 9/2011 | Spry | |
| 2011/0231519 A1 * | 9/2011 | Luby | H04N 21/23106 |
| | | | 709/219 |
| 2011/0314130 A1 | 12/2011 | Strasman | |
| 2012/0082158 A1 | 4/2012 | Reddy | |
| 2012/0090036 A1 | 4/2012 | Kang et al. | |
| 2012/0124179 A1 | 5/2012 | Cappio et al. | |
| 2012/0233247 A1 | 9/2012 | Ashrafi | |
| 2012/0254591 A1 | 10/2012 | Hughes et al. | |
| 2012/0265856 A1 | 10/2012 | Major et al. | |
| 2012/0278495 A1 | 11/2012 | Furbeck | |
| 2012/0290611 A1 | 11/2012 | Gabin et al. | |
| 2012/0290644 A1 * | 11/2012 | Gabin | H04L 65/613 |
| | | | 709/203 |
| 2012/0307280 A1 | 12/2012 | Ishihara | |
| 2013/0007576 A1 | 1/2013 | Lund | |
| 2013/0013803 A1 | 1/2013 | Bichot | |
| 2013/0042015 A1 * | 2/2013 | Begen | H04N 19/154 |
| | | | 709/231 |
| 2013/0054728 A1 | 2/2013 | Amir et al. | |
| 2013/0095806 A1 | 4/2013 | Salkintzis et al. | |
| 2013/0097309 A1 | 4/2013 | Ma et al. | |
| 2013/0132605 A1 | 5/2013 | Kocks et al. | |
| 2013/0166690 A1 | 6/2013 | Shatzkamer | |
| 2013/0166868 A1 | 6/2013 | Jamikov et al. | |
| 2013/0166906 A1 | 6/2013 | Swaminathan | |
| 2013/0191511 A1 | 7/2013 | Liu et al. | |
| 2013/0275557 A1 * | 10/2013 | Myers | H04N 21/85406 |
| | | | 709/219 |
| 2013/0276009 A1 | 10/2013 | Ajitomi et al. | |
| 2013/0304848 A1 | 11/2013 | Lyle et al. | |
| 2013/0346590 A1 | 12/2013 | Scurtu et al. | |
| 2014/0082054 A1 * | 3/2014 | Denoual | H04L 65/75 |
| | | | 709/203 |
| 2014/0089467 A1 | 3/2014 | Beck et al. | |
| 2014/0095670 A1 | 4/2014 | Ozgur | |
| 2014/0156948 A1 | 6/2014 | Roberts | |
| 2014/0173677 A1 | 6/2014 | Lohmar | |
| 2014/0201335 A1 * | 7/2014 | Wang | H04N 21/8456 |
| | | | 709/219 |
| 2014/0237085 A1 * | 8/2014 | Park | H04L 65/612 |
| | | | 709/219 |
| 2014/0244828 A1 | 8/2014 | Besehanic | |
| 2014/0245359 A1 | 8/2014 | De Foy | |
| 2014/0269497 A1 | 9/2014 | Jain et al. | |
| 2014/0304377 A1 | 10/2014 | Andersson et al. | |
| 2014/0359081 A1 | 12/2014 | Van Deventer | |
| 2015/0195243 A1 | 7/2015 | Roskind | |
| 2015/0207846 A1 | 7/2015 | Famaey et al. | |
| 2015/0358373 A1 | 12/2015 | Famaey et al. | |
| 2016/0149978 A1 | 5/2016 | Wissingh et al. | |
| 2016/0198202 A1 | 7/2016 | Van Brandenburg et al. | |
| 2016/0248835 A1 | 8/2016 | Petrangali et al. | |
| 2016/0337902 A1 * | 11/2016 | Hahn | H04W 28/08 |
| 2019/0089756 A1 | 3/2019 | Wissingh et al. | |
| 2019/0149589 A1 | 5/2019 | van Deventer et al. | |

FOREIGN PATENT DOCUMENTS

| | | |
|---|---|---|
| EP | 2 360 923 A1 | 8/2011 |
| EP | 2525587 A1 | 11/2012 |
| EP | 2 587 824 A1 | 1/2013 |
| EP | 2 605 469 A1 | 6/2013 |
| EP | 2 723 033 A1 | 4/2014 |
| GB | 2472985 A | 3/2011 |
| JP | 2011-53244 | 2/1999 |
| JP | H1153244 | 2/1999 |
| JP | 2001101061 | 4/2001 |
| JP | 2004-310593 | 11/2004 |
| JP | 2006-171822 | 6/2006 |
| JP | 2009-157694 | 7/2009 |
| JP | 2009-187466 | 8/2009 |
| JP | 2014017741 | 1/2014 |
| WO | 2002044905 | 6/2002 |

(56) References Cited

FOREIGN PATENT DOCUMENTS

| WO | WO 2009/075033 | | 6/2009 |
|---|---|---|---|
| WO | WO 2009/095078 | | 8/2009 |
| WO | 2011/038032 | A2 | 3/2011 |
| WO | WO 2011/026887 | | 3/2011 |
| WO | WO 2011/038032 | A2 | 3/2011 |
| WO | WO 2011/047335 | | 4/2011 |
| WO | WO 2011/127312 | | 4/2011 |
| WO | WO 2011/059286 | A3 | 5/2011 |
| WO | WO 2011/066691 | | 6/2011 |
| WO | 2011/087449 | A1 | 7/2011 |
| WO | WO 2011/101371 | A1 | 8/2011 |
| WO | 2012/010714 | A1 | 1/2012 |
| WO | WO 2012/107341 | | 8/2012 |
| WO | WO 2012/123773 | A1 | 9/2012 |
| WO | 20120138895 | | 10/2012 |
| WO | WO 2012/178174 | | 12/2012 |
| WO | 2013098317 | | 4/2013 |
| WO | WO 2013/098319 | A1 | 7/2013 |
| WO | WO 2013/107502 | A1 | 7/2013 |
| WO | WO 2014/02330 | A1 | 2/2014 |
| WO | WO 2014/023330 | | 2/2014 |
| WO | WO 2014/090761 | | 6/2014 |
| WO | WO 2015/000936 | | 1/2015 |
| WO | WO 2015/121342 | | 8/2015 |

OTHER PUBLICATIONS

Lo Iacono, L., et al., "Web-native Video Live Streaming," The Second International Conference on Building and Exploring Web Based Environments, 14-19 (2014).

EP Search Report for Application No. 14155014.5, dated Jun. 12, 2014.

EP Search Report for Application No. 14173839.3, dated Nov. 10, 2014.

Oyman, O., et al., "Quality of Experience for HTTP Adaptive Streaming Services," QoE Management in Emerging Multimedia Services, IEEE Communications Magazine, pp. 20-27 (2012).

Notification of Transmittal of the International Search Report and the Written Opinion of the International Searching Authority, or the Declaration for PCT/EP2015/052950, entitled: "Requesting Multiple Chunks From A Network Node On The Basis Of A Single Request Message," dated May 28, 2015.

Akhshabi, Saamer, et al., "What Happens When HTTP Adaptive Streaming Players Compete for Bandwidth," NOSSDAV 12, 6 pgs., Jun. 7-8, 2012.

Cleays, et al., "Design of a Q-Learning Based Client Quality Selection Algorithm for HTTP Adaptive Streaming," Proceedings of the Adaptive and Learning Agents Workshop, part of AAMAS 2013, May 2013.

Huysegems, R., et al., "Session Reconstruction for HTTP Adaptive Streaming. Laying the Foundation for Network-Based QoE Monitoring," Bell-Labs, Alcatel-Lucent, IEEE, 9 pgs., 2012.

Jiang, Junchen, et al., "Improving Fairness, Efficiency, and Stability in HTTP-Based Adaptive Video Streaming With FESTIVE," IEEE, ACM Transactions on Networking, vol. 22, No. 1, pp. 326-340, Feb. 2014.

Petrangeli, Stefano, et al., "A Multi-Agent Q-Learning-based Framework for Achieving Fairness in HTTP Adaptive Streaming," *IEEE*, Network Operations and Management Symposium (NOMS), 9 pgs., May 5-9, 2014.

Mueller, C., et al., "A Proxy Effect Analysis and Fair Adatpation Algorithm for Multiple Competing Dynamic Adaptive Streaming Over HTTP Clients," pp. 1-6, Visual Communications and Image Processing (VCIP) (Nov. 2012).

Bouten, N., et al., "QoE-driven in-network optimization for Adaptive Video Streaming Based on Packet Sampling Measurements," Computer Networks, 81: 96-115 (2015).

Stockhammer, T., Proposal, "CE-Sand: HTTP Communication Channel" MPEG Meeting, Motion Picture Expert Group or ISO/IEC JTC1/SC29/WG11, pp. 1-14 (Oct. 2014).

Van Der Hooft, J., et al., Parameters Self-Learning Optimization of Adaptive Video Streaming, Retrieved from the Internet: URL:http://buck.ugent.be.fulltxt.RUG01/002/153/683/rug01-002153683_2014_0001_AC.pdf (Oct. 2014).

Sniffen, "Practically Engageable Adversaries for Streaming Media," FAST, pp. 1-9 (2009).

Zhanikeev, M., et al., "Building a Media Player in Browser using HTML5 WebWorkers," Proceedings of the 2012 Engineering Sciences Society Conference of IEICE 2, Institute of Electronics, Information and Communication Engineers, Aug. 28, 2012, pp. S-44 to S-45.

T. Stockhammer, "Dash in Mobile Networks and Services, and Visual Communications and Image Processing (VCIP)," 2012, IEEE, Nov. 27, 2012.

ADOBE, "HTTP Dynamic Streaming," May 25, 2013, 2 pages, http://wwwimages.adobe.com/www.adobe.com/content/dam/Adobe/en/products/hds-d yna m ic-strea m ing/pdfs/hds datasheet. Pdf.

Cohen, E. and Kaplan, H., "Prefetching the Means for Document Transfer: A New Approach for Reducing Web Latency," Computer Networks, 39(4): 437-455 (2002).

DNS Reviews, "DNS Comparison," Dec. 18, 2012, 24 pages, https://web.archive.org/web/20131218212046/http:I/ www.dnsreviews.com/dns-comparison/.

Francis, P., S. Jamin, J. Cheng, Y. Jin, D. Raz, Y. Shavitt, and L. Zhang, "IDMaps: A global Internet host distance estimation service," IEEE/ACM Transactions on Networking, 9(5), pp. 525-540, 2001.

GOOGLE code, "Minimize round-trip times," Mar. 14, 2012 (last updated Jan. 9, 2019), 5 pages, https://web.archive.org/web/20120314000842/ http:// code_google.com/speed/page-.

GTmetrix, "Page Speed: Minimize Redirects," May 31, 2012, 5 pages, https://web.archive.org/web/20120531001856/http://gtmetrix.com/minimize-redirects.html.

Gummadi, K. P., S. Saroiu, and S. D. Gribble, "King: Estimating latency between arbitrary Internet end hosts," 2nd ACM SIGCOMM Workshop on Internet measurement, pp. 5-18, 2002.

Hartung, Frank, et al., "DRM Protected Dynamic Adaptive HTTP Streaming," MMSys '11, pp. 277-282, Feb. 23-25, 2011.

http://blog.chromium.org/2008/09/dns-prefetching-or-pre-resolving.html, The Chromium Blog, DNS Prefetching (or Pre-Resolving) (Sep. 17, 2008).

http://blogs.msdn.com/b/ie/archive/2011 /03/17 /internet-explorer-9-network-performance-improvements.aspx, 1 EBlog (Mar. 17, 2011).

http://stackoverflow.com/questions/3778347/is-it-ok-to-http-redirect-images. Questions tab (Sep. 23, 2010).

Information technology—Dynamic adaptive streaming over HTTP (DASH)—Part 1: Media presentation description and segment formats, ISO/IEC 23009-1, Apr. 1, 2012, 134 pages.

Information technology—MPEG systems technologies—Part 6: Dynamic adaptive streaming over HTTP (DASH), ISO/IEC JTC, ISO/IEC FCD 23001-6, Jan. 28, 2011, 86 pages.

Lee, Jin Young et al., Dynamic Adaptive Streaming Over HTTP (DASH) EE#1-CMP Participants, International Organisation for Standardisation Organisation Internationale De Normalisation, ISO/IEC JTC1/SC29/WG11, Oct. 2010.

Liu, "Client-Driven Joint Cache Management and Rate Adaptation for Dynamic Adaptive Streaming over HTTP," Jan. 3, 2013.

Ma, Kevin J. and Bartos, Radim, "DRM Workflow Analysis for Over-The-Top HTTP Segmented Delivery," IEEE, 2011.

Mavlankar, et al., "An interactive region-of-interest video streaming system for online lecture viewing," 18th International in Packet Video Workshop (PV), IEEE, pp. 64-71 (2010).

Microsoft, "Smooth Streaming: the Official Microsoft IIS Site," Dec. 19, 2012, 2 pages, http://www.iis.net/downloads/microsoft/smoath-streaming.

Network Performance, DNS Response Times, Jan. 2, 2012, 7 pages, http://www.plus.net/support/service/network_performance/dns_response_times.shtml.

Ng, E. and H. Zhang, "Predicting Internet network distance with coordinates-based approaches," IEEE INFOCOM, 2002.

Pantos et al., "HTTP Live Streaming draft-pantos-http-live-streaming-07," Sep. 30, 2011, 33 pages.

(56) References Cited

OTHER PUBLICATIONS

Pantos, R. and May, W., "HTTP Live Streaming," draft-pantos-http-live-streaming-08, Apple, Inc., server date Mar. 26, 2012; downloaded by EPO on Mar. 27, 2012, Mar. 23, 2012.

Peterson, "A Simple Approach to CDN Interconnection, "http://tools.ietf.org/html/draft-peterson-cdni-strawman-OO, A Simple Approach to CON Interconnection draft-peterson-cdni-strawman-00 (Apr. 19, 2011).

Prasad, R., C. Dovrolis, M. Murray, and K. Claffy, "Bandwidth estimation: metrics, measurement techniques, and tools," IEEE Network, 17(6), pp. 27-35, 2003.

RequestPolicy, "What is Prefetching?" Mar. 2, 2010, 1 page, https://web.archive.org/web/20100302173012/http://www.requestpolicy.com/help/prefetch.

Singer, David, "On HTTP Streaming," TSG-SA4#60 meeting, Tdoc S4 (10)0610, Aug. 2010.

Sodagar, Iraj, "The MPEG-DASH Standard for Multimedia Streaming Over the Internet," Industry and Standards, IEEE Computer Society, pp. 62-67, Oct.-Dec. 2011.

Stockhammer, et al., "Dynamic Adaptive Streaming over HTTP (DASH) MPEG," International Organization for Standardization, ISO/IEC JTC1/SC 29, MPEG/M18620 (Oct. 2010) Guangzhou, China.

Stockhammer, T., "Technologies under Consideration for Dynamic Adaptive Streaming over HTTP 23009, parts 1 and 4", International Organization for Standardisation, ISO/IEC JTC1/SC29/WG11 MPEG2011/N12887, Coding of Moving Pictures and Audio (Jul. 2012) Stockholm, Sweden.

Stockhammer, T., et al., "Next segment signaling through HTTP GET extension for CDNs", International Organization for Standardisation, ISO/IEC JTC1/SC29/WG11, MPEG2010/M252986 Coding of Moving Pictures and Audio (Jul. 2012) Stockholm, Sweden.

Su, et al., "Drafting Behind Akamai {travelocity-based detouring)," ACM SIGCOMM Computer Communication Review 36.4, 2006, pp. 435-446.

Title Unknown, http://www.limelightnetworks.com/2011/02/appnoteandroidapps/ (Applicant last attempted to access this webpage on Jul. 16, 2014, but the site would not load; Applicant does not have a printout of the webpage).

Van Brandenburg, R., et al., "Models for Adaptive-Streaming-Aware CDN Interconnection," draft-brandenburg-cdni-has-02, server date Jun. 26, 2012; downloaded by EPO on Jun. 29, 2012, Jun. 27, 2012.

Whitepaper Manual (2010).

Wikipedia Foundation, "HTTP cookie", Jun. 28, 2013, available via the Internet at en.wikipedia.org/w/index.php? title=HTTP cookie &oldid=561910611 (last visited Jun. 26, 2018).

\* cited by examiner

```
<MPD type = "static"
...
<BaseURL>http://www.movie.com</BaseURL>
<Period>
  <AdaptationSet>
    <BaseURL>movie/</BaseURL>
    <SegmentTemplate
      <SegmentTemplate media="movie_c$Number$_q$Bandwidth$.mp4" />
    <Representation />
    ...
  </AdaptationSet>
  ...
</Period>
...
</MPD>
```

232 — `<MPD type = "static"`
234 — `<BaseURL>movie/</BaseURL>`
238 — `movie_c$Number$_q`
240 — `$Bandwidth$.mp4`
236 — SegmentTemplate media line

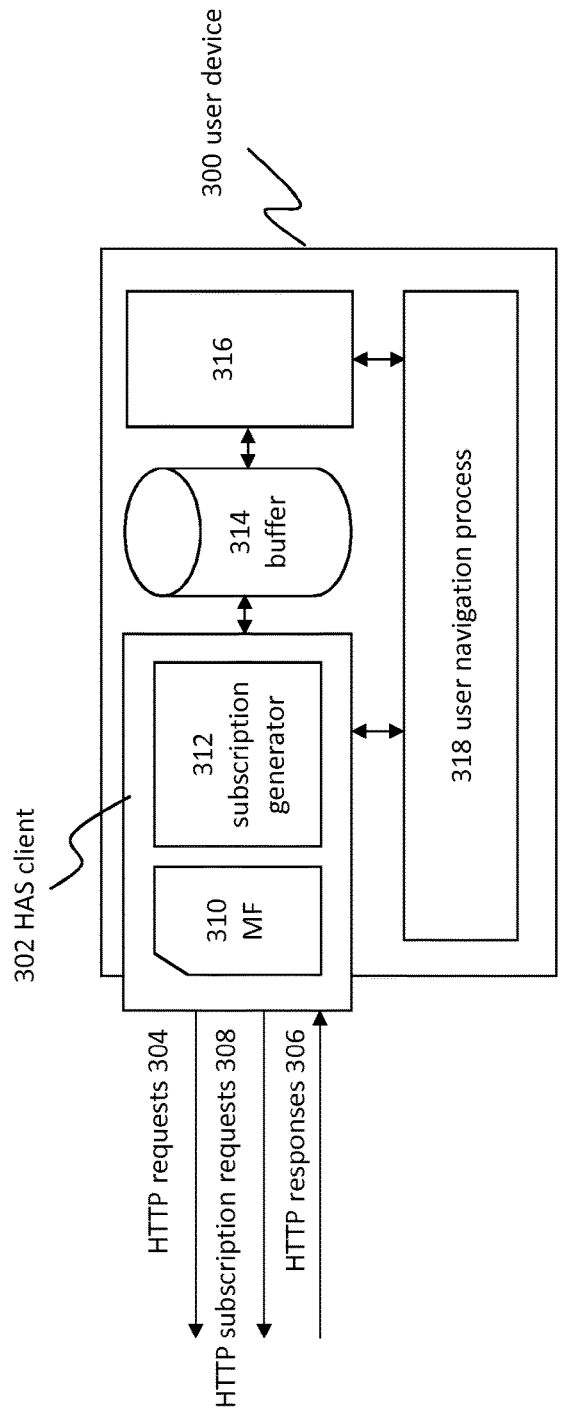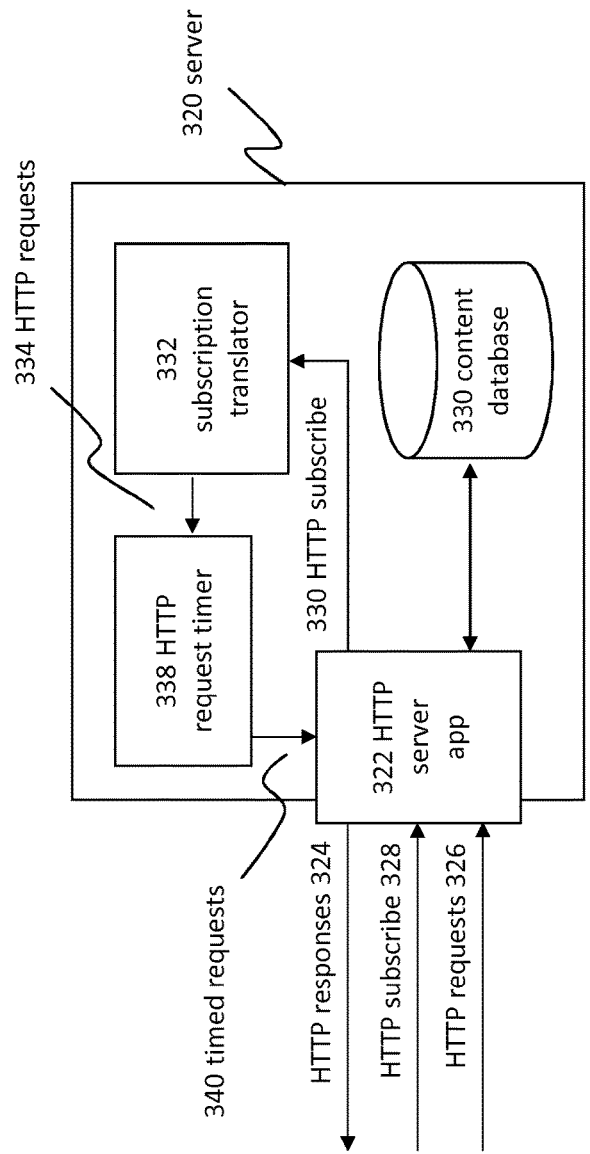
FIG. 3A
FIG. 3B

```
<MPD type = "static" mediaPresentationDuration = "PT3256S"
 profiles = "urn:mpeg:dash:profiles:isoff-on-demand:2011"
 supportSubscription = "true">            1102
<BaseURL>http://www.deliverynode.com</BaseURL>
<Period>                     1104
 <AdaptationSet>
  <BaseURL>movie/</BaseURL>
  <SegmentTemplate media="movie_c$Number$_q$Bandwidth$.mp4" />
  <Representation />                1106
  ...
 </AdaptationSet>
 ...
</Period>
</MPD>
                                                              mpd.xml
```

```
HTTP GET movie/movie_c{Number}_q1.mp4
Host: www.deliverynode.com
Number: 1;1,2;2s
```
1108

```
HTTP GET movie/movie_c{Number}_q1.mp4?Number=2;1,2;2s
Host: www.deliverynode.com
```
1110

FIG. 11

```
<MPD type = "static" mediaPresentationDuration = "PT3256S"
profiles = "urn:mpeg:dash:profiles:isoff-on-demand:2011"
supportSubscription = "true", subscriptonFormat = "substitution">     ⎫
<BaseURL>http://www.deliverynode.com</BaseURL>                        ⎬ 1204
<Period>                           1202
  <AdaptationSet>
    <BaseURL>movie/</BaseURL>
    <SegmentTemplate media="movie_c$Number$_q$Bandwidth$.mp4" />    ⎬ 1206
    <Representation />
    ...
  </AdaptationSet>
  ...
</Period>
...
</MPD>
                                                              mpd.xml
```

```
HTTP GET movie/movie_c1;1,2;2s_q1.mp4                                ⎬ 1204
Host: www.deliverynode.com
```

FIG. 12

REQUESTING MULTIPLE CHUNKS FROM A NETWORK NODE ON THE BASIS OF A SINGLE REQUEST MESSAGE

This application is the U.S. National Stage of International Application No. PCT/EP2015/052950, filed Feb. 12, 2015, which designates the U.S., published in English, and claims priority under 35 U.S.C. §§ 119 or 365(c) to European Application No. 14155014.5, filed Feb. 13, 2014, and claims priority under 35 U.S.C. §§ 119 or 365(c) to European Application No. 14173839.3, filed Jun. 25, 2014. The entire teachings of the above applications are incorporated herein by reference.

FIELD OF THE INVENTION

The invention relates to requesting multiple chunks from a network node on the basis of a single request message, and, in particular, though not exclusively, to methods for requesting multiple chunks from a network node on the basis of a single request message, a user device comprising an adaptive streaming client that is configured for requesting multiple chunks on the basis of a single request message, a network node for delivering multiple chunks to said client on the basis of a single request message and a computer program product for implementing such method.

BACKGROUND OF THE INVENTION

With the growing popularity of Internet video and Internet TV, there is an increasing need for adaptive streaming solutions that allow continuous playback and best user experience under varying network conditions. The concept of adaptive streaming is based on the idea to adapt the bandwidth required by the video stream to the bandwidth available on the network path between the streaming source and the client, wherein the bandwidth is adapted by changing the bit-rate (i.e. the quality) of the video stream.

Currently a number of HTTP-based adaptive streaming (HAS) protocols are developed. Examples of such protocols include such as Apple HTTP Live Streaming [http://tools.ietf.org/html/draft-pantos-http-live-streaming-07], Microsoft Smooth Streaming [http://www.iis.net/download/Smooth-Streaming], Adobe HTTP Dynamic Streaming [http://www.adobe.com/products/httpdynamicstreaming], 3GPP-DASH [TS 26.247 Transparent end-to-end Packet-switched Streaming Service (PSS); Progressive Download and Dynamic Adaptive Streaming over HTTP].

In an effort to harmonize the market around a unique technology, ISO has produced ISO/IEC 23009, which is referred to as the MPEG Dynamic Adaptive Streaming over HTTP (MPEG DASH). In HAS solutions a content stream is usually (temporally and, sometimes also, spatially) partitioned into "chunks". A chunk may relate to a fragment that is stored as a part of a large file or, it may relate to a segment (whereby each segment is stored as a separate file). Chunks may have any duration, but are usually between 2 seconds (e.g., Microsoft Smooth Streaming) and 10 seconds (e.g., Apple HTTP Live Streaming) in duration and may be available in one or more quality representations using e.g. a suitable coding scheme such as Scalable Video Coding (SVC). Streaming content on the basis of chunks allows a streaming client to seamlessly adapt the quality of the video from one chunk request to the next, based on current network and device conditions (e.g., measured bandwidth, available CPU, buffer size).

A content delivery network (CDN) is typically used to efficiently deliver chunks to a large number of streaming clients. The chunks and their different representations are described in a so-called manifest file, which may comprise information about the segments in the stream (segment identifiers, location, play-out time, etc.) and the temporal relation between different segments in the stream.

In MPEG DASH the manifest file is also referred to as the Media Presentation Description (MPD) and comprises chunks identifiers and one or more chunk locators, e.g. URLs pointing to network nodes that are configured to deliver chunks. At the start of the streaming session, the client first requests the manifest file for determining the set of available quality representations, the representation bitrates, the number of chunks, and their locations. Thereafter chunks may be requested in sequence using the HTTP GET method. The quality representation of a to be requested chunk may be determined by the client's rate adaptation algorithm.

Currently content is processed in an ever-increasing number of chunks. Examples include temporally segmented content encoded using Scalable Video Coding (SVC), or ultra-high resolution content that is spatially segmented. SVC-based content is encoded in such a way that decoding a certain quality representation requires the chunks of all lower quality representations with the same chunk identifier as well. As such, requesting quality representation X, results in X HTTP GET requests for each temporal chunk (compared to only one for the default AVC-based HAS, where quality representations can be decoded independently). For spatially segmented content this problem becomes even worse, as each temporal chunk may consist of multiple spatial chunks in multiple quality representations.

These evolutions result in an immense increase in the number of HTTP GET requests that need to be sent in order to receive chunkedcontent, using HTTP adaptive streaming (HAS). Using HAS to retrieve content by sending a multiple of such HTTP GET requests causes a reduction in effective throughput, due to delay that occurs between sending and receiving each of these requests. The manner in which most HTTP adaptive streaming techniques work, is that a subsequent request for a chunk is only sent after the chunk of the preceding request is actually received by the client. The available bandwidth in the period between sending a request and starting transmission of the requested chunk, is not used for transmitting data to the client and thus cuts in on the effective (or perceived) bandwidth, as measured over a period of time. Additionally, the immense increase in the number of HTTP GET requests causes much additional overhead, in terms of CPU, memory and bandwidth consumption, on the server and intermediary caches that need to process these requests. This may in itself cause further delays in processing that could further impact the achievable bitrate when using HAS, and/or the scalability of HAS based streaming given a certain infrastructure.

WO2012123773(A1) discloses a method for generating a media fragment request for requesting fragments (portions) of an encoded media stream stored on a server device, the method being implemented by a client device storing a structure representative of fragments (portions) of said media stream previously received and stored on said client device. The structure comprises first and second types of addressing information associated with fragments already received. The method for generating a media fragment request comprises forming a media fragment request to obtain missing media data corresponding to a new fragment of said media stream, said media fragment request specifying at least one piece of addressing information of the first type and at least one addressing information of the second type, wherein said first type of addressing information is spatial or temporal information and wherein said second type of addressing information is byte position information within said media stream. The method according to WO2012123773(A1) is explained in the context of the MF URI 1.0 specification which describes a protocol for exchanging multimedia portions, typically video, also referred to as 'media fragments'. An aim of the disclosed method is to solve a problem of the MF URI 1.0 specification, which according to WO2012123773 (A1) teaches that multimedia portions (i.e. sub-streams) extracted from a multimedia file need to be independently decodable. To satisfy this requirement an extracted and delivered multimedia portion encoded in a video compression format, such as H.264 or MPEG-4 that uses so-called temporal prediction, may be larger than the requested portion. A requested portion is typically specified by a time interval in combination with a general reference to the content. According to WO2012123773 (A1) the above requirement may thus cause overlap in media retrieval between requests of connecting time intervals and may lead to retrieving certain multimedia (video) portions twice. The above disclosed method aims to solves this problem by specifying in a request which part of the to be requested multimedia portion of a file is already received with responses to preceding requests. In order to do this, the receiving device, keeps track of which portions have been received, on the basis of byte position information provided in the responses. The method according to WO20112123773 (A1) is generic for HTTP based media retrieval and does not disclose, teach or suggest the use of HTTP adaptive streaming, such as the use of a manifest file defining a specific collection of predetermined chunks of content of various qualities that may be specifically requested, nor hint to or solve the specific problems that may occur in such context, such as elaborated on in this application.

With regard to one of these prior art problems, the need for sending a unique request for every chunk of content and the waiting period for the next request until the chunk associated with the preceding request is received (which cuts into the effective bandwidth), may be partially solved by a known technique called HTTP pipelining. Specifically, pipelining may allow the latency problem to be reduced or removed. However, it does not address the request overhead problem. Also with pipelining for each chunk a separate request including the necessary overhead, is still required. A further additional problem may be introduced by using pipelining for adaptive streaming. The principle of pipelining is that it requires (causes) requests for the one or more next chunks to be sent prior to receiving the current chunk (e.g. the chunk preceding these to be requested chunks). The quality selection decision for the requested chunk, which is part of HTTP adaptive streaming, is therefore potentially performed using out-dated information. Parameters influenced by the speed with which the current chunk is received (e.g. a change in buffersize, effective throughput measured by the requesting entity) are not taken into account for requesting one or more subsequent chunks. Furthermore, pipelining does not support cancelling these subsequent requests. It may thus be that whilst the network conditions no longer support the retrieving of a certain quality representation of chunked content, requests for this quality representation are already made. This may seriously affect the Quality of Experience of the rendered chunked content, since the requested chunks may arrive too late for being rendered 'in time', thus leading to artifacts in the rendered content (such as a freeze of the image).

From the above it follows that there is a need in the art for method and systems that reduces the total request overhead for HAS content, and specifically complex content consisting of a huge number of chunks that need to be requested (e.g., scalable video, or spatially segmented content).

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module", "node", "client" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an objective of the invention to reduce or eliminate at least one of the drawbacks known in the prior art. In an aspect the invention may relate to a computer-implemented method for requesting a plurality of chunks by a streaming client, preferably an adaptive streaming client, on the basis of a single request message. The adaptive streaming client, in the context of streaming using HTTP or a HTTP variant, is generally known as a HTTP Adaptive Streaming (HAS) client.

In embodiments of the invention, the request message is preferably a HTTP (chunk) request message, such as a HTTP 1.1 or HTTP 2 request message. The HTTP 2 request message may be a HTTP 2 Headers message. Alternatively the request message may however also be a WebSocket based request message. The WebSocket message being transmitted as one or more WebSocket frames. Throughout the application the (chunk) request message is also referred to as a (HTTP) subscribe message or subscription request message. The sender of such a message 'subscribes' or in other words 'takes a subscription' to being provided with a plurality of chunks (segments) defined by such message.

In an embodiment, said chunks may be defined on the basis of a manifest file comprising chunk identifiers for determining at least one delivery node configured to deliver chunks defined by said chunk identifiers to said client.

In an embodiment said method may comprise at least one processor, preferably at least one microprocessor, in said client executing computer readable program code for: determining, preferably on the basis of said manifest file, a first request message, preferably one of a HTTP GET message or a HTTP HEADERS Frame message or a WebSocket based message, for requesting a first plurality of chunks, said first request message comprising one or more first chunk template parameters; The requested chunks are preferably segments, which are chunks individually stored as files. This has the significant advantage that chunked content (i.e. a collection of chunks associated with a content item) may be distributed over more than one location. It also allows for caching in the network, allowing for more efficient distribution of content as compared to storing the content as whole at one or more locations. Alternatively the requested chunks may also be fragments, which relate to individually retrievable parts of a content file. Said method may further comprises ending said first request message to a first network node, preferably a delivery node or a cache, wherein said first network node is configured for determining a first plurality of chunk identifiers, preferably a first plurality of URLs, associated with said first plurality of chunks on the basis of said one or more first chunk template parameters and a first chunk template, comprising one or more chunk template parameters fields; and, receiving at least one response message, preferably a HTTP response message such as a HTTP OK message or a HTTP DATA Frame message, or alternatively a WebSocket (based) response message, comprising a single chunk associated with one of said chunk identifiers that were determined on the basis of said first chunk template and said one or more first chunk template parameters. If the first request message is a Web-Socket (based) message, the at least one response message is thus preferably also a WebSocket (based) response message. If the first request message is a HTTP 1.1 message, the response message is preferably also a HTTP 1.1 message.

If the first request message is a HTTP 2 message, preferably a HTTP HEADERS Frame message, the response message is preferably also a HTTP 2 message (typically a HTTP DATA Frame message). The same would be the preferred mode of operation for all request-response messages in embodiments according to the invention.

In an embodiment, said first chunk template may be an URL chunk template, i.e. a template that complies with the conventions that determine the syntax of an URL. The URL chunk template is also known as URL template. The two terms are used interchangeably throughout this application.

The invention allows a client to send a single request message, preferably a HTTP or WebSocket based (chunk) request message for requesting (a delivery node) to provide a predetermined collection, preferably comprising a plurality of (spatial, temporal and/or quality related) chunks. This way problems associated with the large overhead of request messages that may exist when dealing with a large number of streaming clients, each requesting chunked content that may have many different quality representation and/or small chunk sizes, may be eliminated or at least substantially reduced. The single request message that allows the reduction of the overhead may also be referred to as a subscribe message (a subscription). Throughout the application this subscribe message is also referred to as a HTTP subscribe message (e.g. for HTTP 1.1 and HTTP 2 implementations, not excluding future next generation HTTP implementations), or as a WebSocket subscription or WebSocket subscribe message. A WebSocket subscribe message is a subscribe message that is transmitted (sent) using WebSockets.

The invention increases the (effective) bandwidth that is available to the (adaptive) streaming client. This may allow the streaming client to maintain the quality of streaming at a higher level than would be possible without using the invention and/or it may reduce the number of times a streaming client switches back to a lower quality video streaming because of bandwidth considerations. The invention is particularly suitable for being used in a stable network environment, such as a network managed by an (television) operator which may be used for providing television services on the basis of adaptive streaming technologies such as MPEG-DASH. The term 'stable' refers preferably to the fluctuation in perceived or measured bandwidth at the client (device). The more stable a network (e.g. a streaming) environment is, the less fluctuation in these parameters exists.

The reduction of the request overhead by the (HTTP or WebSocket) subscribe message may be achieved by sending chunk template parameters in the (HTTP or WebSocket) subscribe message to the network. The chunk template parameters may be used by a network node to generate a set of chunk identifiers and/or URLs on the basis of a chunk template. An URL would generally comprise a chunk identifier and a chunk locator. The chunk template may comprise chunk template fields that can be specified on the basis of (e.g. replaced by) the chunk template parameters. This way a large set of HTTP request messages, preferably HTTP segment request messages, may be efficiently generated on the basis of a single chunk template and some chunk template parameters.

In an embodiment said first (HTTP or WebSocket) request message (i.e. the subscribe message) may comprise said first chunk template. This way the information that is needed for generating the plurality of HTTP request messages and/or chunk identifiers is efficiently sent in one message to the network node.

In an embodiment said network node may be configured for: generating or emulating a set of (HTTP or WebSocket) (single) chunk request messages associated with at least part of said first plurality of chunks on the basis of said first chunk template and said one or more first chunk template parameters; and, sending for at least one of said (HTTP or WebSocket) (single)chunk request messages an (HTTP or WebSocket) response message comprising a chunk to said client. In an embodiment, a predetermined set of (HTTP or WebSocket) response messages may be sent to said client in response to said predetermined set of (HTTP or WebSocket) chunk request messages. Hence, a set of (HTTP or WebSocket) chunk requests may be generated in the network and provided to an (HTTP and/or WebSocket enabled) server in e.g. a delivery node or a cache, for generating a set of (HTTP or WebSocket) response messages that comprise (at least part of) the requested chunks.

In an embodiment, the set of (HTTP or WebSocket) response messages may be sent in a predetermined sequence to said client. Information (e.g. parameters) associated with the chunk template parameters, such as an order attribute, may instruct the network node to provide the (HTTP or WebSocket) chunk request messages in a predetermined order (a predetermined sequence) to the (HTTP and/or WebSocket enabled) server so that the response messages will be sent to the client in a predetermined order.

In an embodiment a chunk template parameter may be associated with an order, range and/or time attribute. The time attribute may specify a time interval that the delivery node needs to wait before sending the next chunk with a different value for that chunk template parameter.

In an embodiment determining said first (HTTP or WebSocket) request message (i.e. said subscribe message) may comprise: determining said chunk template and/or said chunk template parameters on the basis of at least part of said one or more chunk identifiers in said manifest file. Manifest files normally comprise a template and/or a set of chunk identifiers (typically in the form of a set of URLs or partial URLs) for sending chunk request messages to the network. This information template and/or chunk identifiers may be used by the streaming client, in particular the subscription generator module in the streaming client, for generating an URL template, that complies with the URL syntax and that may be part of the request URL of the subscribe message.

In an embodiment, a chunk template parameter may be associated with at least one of: one or more chunk numbers or a range of chunk numbers, one or more chunk presentation times or a presentation time period, one or more chunk quality representations or a chunk quality presentation range, one or more chunk bitrates or a chunk bitrate range, one or more chunk sizes or a range of chunk sizes. Hence, the chunk template parameters may be used to generate a chunk identifier associated with a chunk of a certain type and/or quality. Chunk template parameter attributes may be used to define a sequence of values or a value range for one chunk parameter. Further, a chunk template parameter may be associated with an order attribute, which order attribute instructs the network node, in particular the subscription translator module in the network node, to process the chunk template parameters on the basis of the chunk template in a predetermined sequence.

In an embodiment, the request URL of said first (HTTP or WebSocket) request message (i.e. said subscribe message) may comprise said chunk template and a resource location path associated with said first delivery node. Hence, the chunk template may be part of the request URL of the (HTTP or WebSocket) subscribe message.

In an embodiment, at least part of said one or more chunk template parameters may be added to said (HTTP or WebSocket) request message. In another embodiment, said one or more chunk template parameters may be: inserted in the header of said first (HTTP or WebSocket) request message; inserted in said request URL; and/or, appended to said request as a query string. Hence, different ways are available to efficiently send these parameters to the network.

In an embodiment, determining a first (HTTP or WebSocket) request message may further comprise: inserting a session identifier in said first (HTTP or WebSocket) request message, wherein said session identifier allows said client and/or said network node to link said first (HTTP or WebSocket) request message to one or more further (HTTP or WebSocket) request messages and/or (HTTP or WebSocket) response messages. In an embodiment, said session identifier may be added as a token to said request URL. In another embodiment, said session identifier may be added as a cookie value in the header of said first (HTTP or WebSocket) request message. Hence, the session identifier allows a network node, e.g. a cache, to keep track of the request and response message that belong to one session/subscription (e.g. that are associated with one subscription request message).

In an embodiment of the invention, wherein the request message is a HTTP 2 message (e.g. one or more HEADERS Frames), said session identifier may be a Stream Identifier.

In a further embodiment of the invention, wherein the request message is a WebSocket subscribe message, said session identifier may be a Subscription ID. Since the format of the content of the WebSocket message is free, other forms of session identifiers are also possible.

In an embodiment, said method may further comprise: determining a second (HTTP or WebSocket) request message, preferably a HTTP GET message, wherein said second (HTTP or WebSocket) request message is configured for instructing said first network node to update at least part of said first plurality of chunk identifiers, on the basis of a second plurality of chunk identifiers that are determined by said first network node on the basis of a second chunk template and one or more second chunk template parameters. In an embodiment, said second (HTTP or WebSocket) request message (i.e. subscribe message) may comprise an update parameter for instructing said first network node to update said first (HTTP or WebSocket) request message on the basis of the second (HTTP or WebSocket) request message. For HTTP 2 implementations, the second HTTP request message (e.g. with the 'update') may be preceded by a HTTP 2 cancel message (e.g. a RTS_STREAM Frame).

Hence, an (HTTP or WebSocket) request message may be updated by simply sending an (HTTP or WebSocket) subscribe update message. If an updated request is received, the previous request message (i.e. subscribe message) is replaced, automatically dropping any planned chunks still to be sent (i.e. cancelling the transmission of not yet transmitted chunks identified by the initial subscribe message). This is for example useful for SVC-based HAS, as it allows a client to request all quality layers in a single request, but update that request if it notices there is not enough time left to receive the next quality layer before play out of the temporal chunk needs to commence.

In contrast with prior art schemes such as pipelining (that does not provide such update mechanism), the use of an HTTP update message may substantially reduce the risk of buffer starvation due to changes in the available (i.e. effective) bandwidth. The streaming client may decide to switch back to chunks of a lower quality (e.g. because of changes in the available bandwidth) when the delivery node is still in the process of sending response messages of a previous (HTTP or WebSocket) subscribe message to the client. The HTTP update message may cancel or update the chunk request messages that were generated on the basis of the previous subscribe message and replace these with one or more HTTP request messages of a desired (lower quality) type.

In an embodiment, the update parameter for instructing a network node to update a (HTTP or WebSocket) request message (i.e. subscribe message) is inserted in said further (HTTP or WebSocket) request message, preferably as a token or a cookie as described above. Alternatively, the update parameter may be inserted in an (HTTP or WebSocket) request message as a query string.

In an embodiment according to the invention, said first network node is configured for:

generating at least one (HTTP or WebSocket, i.e. WebSocket based) response message, preferably an HTTP redirection message, associated with one or more chunks that cannot be delivered to said client by said first network node, said (HTTP or WebSocket) response message comprising a resource location path associated with a second network node that is capable of delivering said one or more chunks that cannot be delivered by said first network node. In an embodiment, said (HTTP or WebSocket) response message may further comprise a redirection URL associated with said second network node, preferably said redirection URL comprising said chunk template and one or more second chunk template parameters for defining the one or more chunks that cannot be delivered by said first network node.

Hence, when part of the requested chunks cannot be delivered by a first delivery node, one or more redirection messages may be generated comprising an URL appointing to a further delivery node that may deliver these chunks instead.

In a further aspect, the invention may relate to a network node configured for delivering a plurality of chunks to at least one client, preferably an adaptive streaming client, on the basis of a single (HTTP or WebSocket) request message, said network node comprising: at least one computer readable storage medium having computer readable program code embodied therewith, and at least one processor, preferably at least one microprocessor, coupled to said computer readable storage medium, wherein responsive to executing the computer readable program code, said at least one processor is configured to perform executable operations comprising: receiving a first (HTTP or WebSocket) request message, preferably a HTTP GET message, for requesting delivery of a first plurality of chunks to said client, said first (HTTP or WebSocket) request message comprising one or more first chunk template parameters; determining a first plurality of chunk identifiers, preferably a first plurality of URLs, associated with said first plurality of chunks on the basis of said one or more first chunk template parameters and a first chunk template, preferably an URL chunk template, comprising one or more chunk template parameters fields; and, sending at least one (HTTP or WebSocket) response message to said client, said response message comprising a chunk associated with one of said chunk identifiers that were determined on the basis of said first chunk template and said one or more first chunk template parameters.

In an embodiment, said first (HTTP or WebSocket) request message may comprise said first chunk template.

In an embodiment, said executable operations may further comprise: receiving a second (HTTP or WebSocket) request message, preferably a HTTP GET message, wherein said second (HTTP or WebSocket) request message is configured for instructing said network node to update at least part of said first plurality of chunk identifiers on the basis of a second plurality of chunk identifiers that are determined by said first network node on the basis of a second chunk template and said one or more second chunk template parameters, preferably said second (HTTP or WebSocket) request message comprising an update parameter for triggering said first network node to update said first (HTTP or WebSocket) request message on the basis of the second (HTTP or WebSocket) request message.

In an embodiment, said executable operations may further comprise: in response to said first (HTTP or WebSocket) request message, generating an (HTTP or WebSocket) response message, preferably an HTTP redirection message, associated with one or more chunks that cannot be delivered to said client by said first network node, said (HTTP or WebSocket) response message comprising a resource location path associated with a second network node that is capable of delivering said one or more chunks that cannot be delivered by said first network node In another embodiments, said executable operations may further comprise: in response to said first (HTTP or WebSocket) request message, generating a second (HTTP or WebSocket) request message, associated with one or more chunks that cannot be delivered to said client by said first network node, said second (HTTP or WebSocket) request message comprising a resource location path associated with a second network node that is capable of delivering said one or more chunks that cannot be delivered by said first network node. In an embodiment, said second (HTTP or WebSocket) request message may comprise a request URL said chunk template and one or more second chunk template parameters for defining the one or more chunks that cannot be delivered by said first network node.

In yet a further aspect, the user device may comprise a client, preferably an adaptive streaming client, configured for requesting a plurality of chunks, on the basis of a single (HTTP or WebSocket) request message, said chunks being defined on the basis of a manifest file comprising chunk identifiers for determining at least one delivery node for delivering chunks defined by said chunk identifiers to said client, said user device comprising: a computer readable storage medium having at least part of a program embodied therewith, details software program; and, a computer readable storage medium having computer readable program code embodied therewith, and a processor, preferably a microprocessor, coupled to the computer readable storage medium, wherein responsive to executing the computer readable program code, the processor is configured to perform executable operations comprising: determining a first (HTTP or WebSocket) request message, preferably a HTTP GET message, for requesting a first plurality of chunks, preferably segments, said first (HTTP or WebSocket) request message comprising one or more first chunk template parameters; sending said first (HTTP or WebSocket) request message to a first network node, preferably a delivery node or a cache, wherein said first network node is configured for determining a first plurality of chunk identifiers, preferably a first plurality of URLs, associated with said first plurality of chunks on the basis of said one or more first chunk template parameters and a first chunk template, preferably an URL chunk template, comprising one or more chunk template parameters fields; and, receiving at least one (HTTP or WebSocket) response message comprising a chunk associated with one of said chunk identifiers that were determined on the basis of said first chunk template and said one or more first chunk template parameters; or, receiving at least one HTTP redirection message associated with one or more chunks that cannot be delivered to said client by said first network node, said HTTP redirection message comprising a resource location path associated with a second network node that is capable of delivering said one or more chunks that cannot be delivered by said first network node; preferably said HTTP redirection message further comprising a redirection URL associated with said second network node, preferably said redirection URL comprising said chunk template and one or more second chunk template parameters for defining the one or more chunks that cannot be delivered by said first network node.

In a further aspect, the invention may relate to a non-transitory computer-readable storage media for storing at least part of a manifest file for use by a user device, preferably a user device as described above, wherein user device may comprise a client, preferably an adaptive streaming client, that is configured for requesting a plurality of chunks, preferably segments, on the basis of a single (HTTP or WebSocket) request message, said chunks being defined on the basis of said manifest file, wherein said manifest file comprises: chunk identifiers for determining at least one delivery node for delivering chunks defined by said chunk identifiers to said client; and, a subscription support parameter, preferably a flag, for indicating that said at least one delivery node is configured for determining a first plurality of chunk identifiers, preferably a first plurality of URLs, associated with said first plurality of chunks on the basis of one or more first chunk template parameters and a first chunk template; and, sending at least one (HTTP or WebSocket) response message to said client, said response message comprising a chunk associated with one of said chunk identifiers that were determined on the basis of said first chunk template and said one or more first chunk template parameters.

In an embodiment, said manifest file may further comprise a subscription format parameter for instructing said client to replace at least part of said one or more chunk template parameters fields in the chunk template of the request URL of said single (HTTP or WebSocket) request message with at least part of said one or more chunk template parameters.

In yet another aspect, the invention may relate to a system for requesting a plurality of chunks by a client, preferably an adaptive streaming client, on the basis of a single (HTTP or WebSocket) request message wherein said system comprises one or more user devices and at least network node as described with reference to any of embodiments described above.

The invention may also relate to program product, comprising software code portions configured for, when run in the memory of a computer, executing the method steps as described above. The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIGS. 2A and 2B depict a method for delivering a plurality of chunks to a streaming client on the basis of one chunk request message according to an embodiment of the invention.

FIGS. 3A and 3B depict schematics of a streaming client and an associated delivery node that are configured to process a subscription request message according to various embodiments of the invention.

FIG. 11 depicts a manifest file and associated HTTP subscribe message according to an embodiment of the invention.

FIG. 12 depicts a manifest file and associated HTTP subscribe message according to another embodiment of the invention.

DETAILED DESCRIPTION

Figure 1:
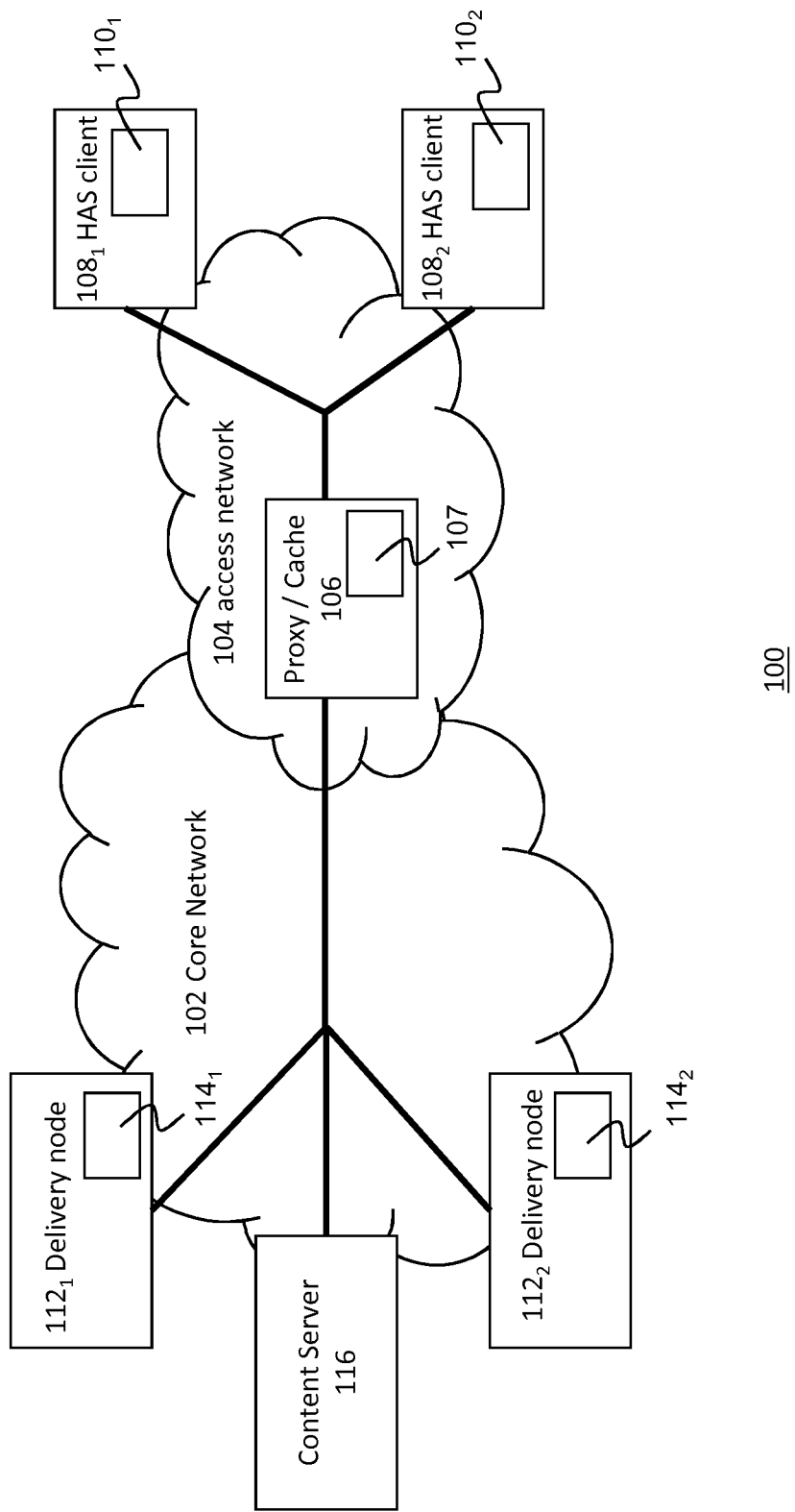
FIG. 1 depicts a system for providing chunked content to a streaming client according to an embodiment of the invention.

FIG. 1 depicts at least part of a content delivery system for delivering multiple chunks to an adaptive streaming client on the basis of a chunk request message according to an embodiment of the invention. In particular, FIG. 1 depicts a schematic of a content delivery system comprising at least one content server 116 and one or more delivery nodes $112_{1,2}$ that may be connected via one or more networks (e.g. a core network 102 and an access network 104) to clients $108_{1,2}$.

The delivery nodes may deliver segmented content to the client on the basis of an adaptive streaming protocol such as the HTTP adaptive streaming (HAS) protocol. Examples of adaptive streaming protocols include Apple HTTP Live Streaming [http://tools.ietf.org/html/draft-pantos-http-live-streaming-07], Microsoft Smooth Streaming [http://www.iis.net/download/SmoothStreaming], Adobe HTTP Dynamic Streaming [http://www.adobe.com/products/httpdynamic-streaming], 3GPP-DASH [TS 26.247 Transparent end-to-end Packet-switched Streaming Service (PSS); Progressive Download and Dynamic Adaptive Streaming over HTTP] and MPEG Dynamic Adaptive Streaming over HTTP [MPEG DASH ISO/IEC 23001-6]. HTTP allows an efficient, firewall-friendly and scalable scheme for delivering chunked (segmented) streams to HAS-enabled clients (aka HAS clients). The delivery nodes may transmit packets associated with the chunks over a unicast connection to a client. Alternatively and/or in addition packets may be transmitted over a broadcast (e.g. a DVB connection), multicast, overlay multicasting, multimedia broadcast multicast connection to clients.

A HAS enabled client may be implemented in a user device, which may generally relate to a (mobile) content play-out device such as an electronic tablet, a smart-phone, a notebook, a media player, a home gateway, AR glasses, or DASH enabled devices such as a DASH-enabled HbbTV display device. Alternatively, the user device may be a set-top box or content storage device configured for processing and temporarily storing content for future consumption by a content play-out device, which has access to the stored content.

The skilled person will readily understand that whenever the term "client" is used for the purpose of describing the invention throughout the application, it may equally refer to one of the devices above, or to a module implemented in one of the devices above, either as hardware as such, or as a combination of hardware and software, as the case may be.

The content server 116 may host manifest files associated with video titles that may be accessed or purchased by the clients. Alternatively, the content server may be configured to generate a manifest file associated with a video title when a video title is purchased via a website of a content provider or the like. The delivery nodes $112_{1,2}$ may host the chunks that are identified in the manifest file.

In the system of FIG. 1, a client may request a manifest file from the content server via e.g. a website. The manifest file that the client receives may comprise chunk identifiers and location information (e.g. in the form of one or more URLs) that point to chunks that are stored at a particular delivery node, e.g. first delivery node $110_1$. On the basis of the manifest file a client may start requesting chunks on the basis of an HTTP request message, e.g. an HTTP GET message, which may be sent via one or more routing proxies and/or caches 106 to a delivery node that hosts the chunk that is identified in the chunk request.

As described earlier, the total number of HTTP GET requests that need to be processed by the system for the delivery of HAS content to a multitude of clients may be substantially. The sending and processing of so many requests may cause a reduction in the effective throughput of the network. This reduction may cause delays that occur between sending and receiving of such requests. Additionally, it causes much overhead, in terms of CPU, memory and bandwidth consumption, on the server and intermediary caches that need to process these requests.

In order to eliminate or at least substantially reduce this problem the client may comprise a subscription generator module (in short a subscription generator), which may be configured to generate one or more predetermined (HTTP or WebSocket based) request messages using information in the manifest file wherein these one or more request messages are configured for instructing a subscription translator module (in short a subscription translator) in a network node, e.g. a delivery node, a cache or another network element, for generating a sequence of single chunk request messages, e.g. in the form of HTTP GET messages, each associated with a chunk that the client needs in order to playout the chunked content. These special request messages (e.g. capable of requesting more than one chunk at a time), which hereafter may be referred to as a (preferably HTTP) subscribe message or a subscription request message, may generate or emulate in a network node a predetermined sequence of chunk request messages (e.g. conventional HTTP GET messages). For each chunk request message, the delivery node may generate a corresponding HTTP chunk response message, comprising a chunk as part of the body of the response message.

As will be described hereunder in more detail, the HTTP subscribe message will significantly reduce the amount of chunk request messages that are sent and processed by content delivery systems as e.g. shown in FIG. 1. Various advantageous formats and uses of the HTTP subscribe message will be described hereunder in more detail.

Figure 2A:
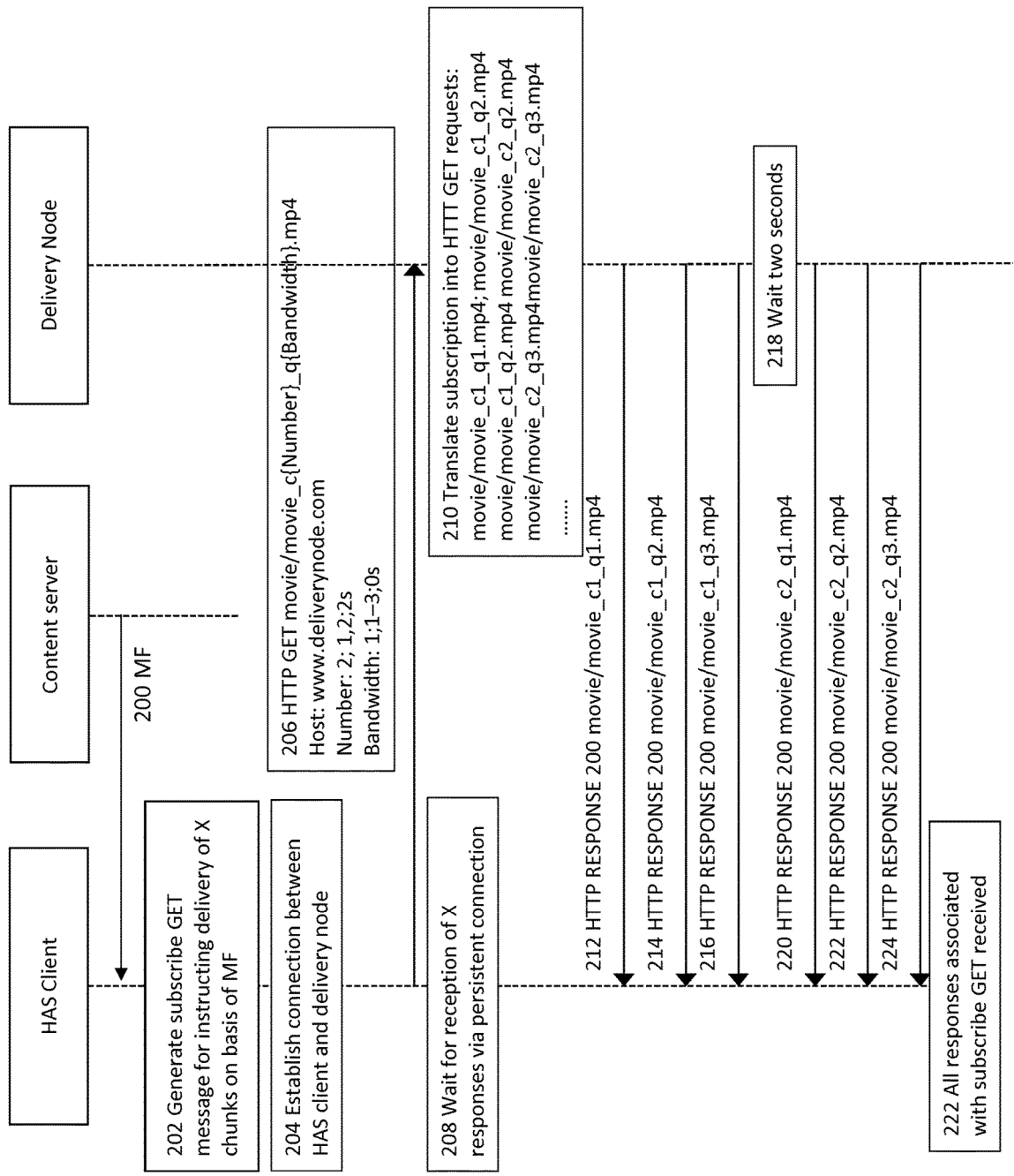

FIG. 2A depicts a method for requesting and delivering a plurality of chunks to a streaming client on the basis of a single HTTP request message according to an embodiment of the invention. In particular, FIG. 2 depicts a method for delivering multiple chunks (in this case SVC chunks) on the basis of a single HTTP GET message to a streaming client. The (HAS) streaming client may comprise a subscription generator module configured for generating an HTTP GET message for requesting delivery of multiple chunks (e.g. in this particular example SVC chunks associated with three quality layers).

A user may connect a user device comprising the streaming client to a network, e.g. the Internet, browse a website of a content provider comprising video title links and select one. Upon selection of a link, e.g. an URL, a manifest file (MF) may be sent to the client (step 200). Here, the term manifest file may generally refer to a special data structure comprising chunk identifiers (descriptors) identifying the chunks building the video title or a part thereof. The chunk identifiers may be used to access a (set of) network node(s), e.g. media server(s), which may be configured to either deliver the chunks (e.g. segments) to the client or to provide the client with information where the chunks may be retrieved.

The subscription generator may generate a predetermined HTTP request message on the basis of the manifest file (step 202). FIG. 2B depicts an example of a manifest file 230 comprising one or more chunk identifiers for retrieving chunks. The chunk identifiers may be embodied in the form of a template 236 (in FIG. 2B referred to as SegmentTemplate) comprising one or more chunk template parameter fields 238,240 associated with chunk template parameters (e.g. in this particular example $Number$ 238 and $Bandwidth$ 240). The manifest file may further comprise one or more base URLs 232,234 (BaseURL) associated with one or more domain names respectively. By combining the base URL(s), the chunk template and the chunk template parameters, a sequence of specific URLs may be determined for determining where the chunks can be retrieved. For example, by setting the parameters Number and Bandwidth it may generate a sequence of URLs:
   movie/movie_c234_1000 kbps.mp4
   movie/movie_c235_1000 kbps.mp4
   movie/movie_c236_1000 kbps.mp4
   movie/movie_c237_1000 kbps.mp4
   movie/movie_c238_1000 kbps.mp4

Other chunk template parameters may include $RepresentationID$ (i.e. the identifiers of the quality representation of a chunk, e.g. in SVC applications), and $Time$, i.e. the start time of the chunk which may be determined on the basis of information on the media presentation timeline of the chunked content.

These URLs may be used to generate HTTP GET messages for requesting the chunks from a delivery node. In an embodiment according to the invention, the client may use the base URL, the chunk template and the chunk template parameters in order to generate an HTTP message for requesting a predetermined sequence of chunks from a delivery node (i.e. the subscribe message).

Preferably the HTTP message has a format that complies with the known HTTP standards such as HTTP/1.1. For example, in order to request three quality versions of the first two chunks of a video, the subscription generator in the HAS client may generate an HTTP request message on the basis of the information in the manifest file, said message including a request URL comprising one or more chunk template parameters and a chunk template.

As will be described hereunder in more detail, chunk template parameters may be used to specify certain fields in the chunk template in order to build an HTTP GET message according to an aspect of the invention (i.e. the subscribe message). In an embodiment, the HTTP GET message may have the following format:
HTTP GET/movie/movie_s{Number}_q{Bandwidth}.mp4 HTTP/1.1
   Host: www.moviewebsite.com
   Number: 2;234,235;2s
   Bandwidth: 1;800,1000,1500;0s In this example, the request URL of the HTTP message may comprise a domain name (in this case http://www.moviewebsite.com/), which may be derived from the BaseURL in the manifest file. Further, the request URL may comprise a chunk template (an URL chunk template) /movie/movie_s{Number}_q{Bandwidth} comprising one or more chunk template parameters fields (in this case a chunk (sequence) number field and a bandwidth parameter field), which may be derived from the SegmentTemplate element in the manifest file. Here, the chunk template parameters fields may be identified by "brackets" ({ . . . }) for indicating the use of an URL template. Each chunk template parameter field may be specified on the basis of chunk template parameters, such as Number or Bandwidth, which in this example may be defined in the HTTP header.

A chunk template parameter may comprise one or more parameter attributes delimited by semicolons, which are used by the subscription translator to produce the correct sequence of URLs that is requested by the client.

In the example above, a chunk template parameter may be associated with an order, range and/or time attribute. For example, the Number chunk template parameter may be associated with order attribute "2" which is higher than the order attribute "1" of the Bandwidth chunk template parameter so that the subscription generator may process the Bandwidth chunk template parameter before the Number chunk template parameter.

Hence, when the subscription translator in a delivery node is parsing the HTTP subscribe message, it may interpret the order attributes of the chunk template parameters in the subscription fields of the header and decide that the three bitrate variants of the first chunk (associated with a first chunk identifier) will be sent, followed by the three bitrate variants of a second chunk (associated with a second chunk identifier), and so on. If the Number chunk template parameter would have had a lower order attribute than the Bandwidth chunk template parameter, the delivery node would first send all (e.g. three) chunks (associated with different chunk identifiers) of a first bitrate and then all chunks (associated with different chunk identifiers) of a second bitrate (and so on) to the client.

The range attribute may specify the values that the associated chunk template parameter may take, wherein the values may be determined by its end points (e.g., "0-10"), by a list (e.g., "1,2,3"), or a combination thereof (e.g., "1,2,5-10"). The time attribute (i.e. time parameter) may specify a time interval that the delivery node needs to wait before sending the next chunk with a different value for that chunk template parameter.

After the client has generated a HTTP subscribe message (that complies with the HTTP standard), the client may establish a connection, e.g. a TCP/IP connection, with the delivery node (step 204). The connection may be established on the basis of an IP address and port that is determined on the basis of the request URL using e.g. a suitable DNS scheme. The TCP/IP connection may be persistent connection that allows the exchange of multiple HTTP request-response messages via one connection (identified by its IP address and port). The HTTP subscribe message may be sent over the connection to the delivery node identified in the request URL.

Hence, in the example above, the client may send the HTTP subscribe message, preferably a predetermined HTTP GET message according to the invention that complies with the HTTP standard, to the delivery node (step 206) in order to instruct the delivery node to deliver chunks of different bitrates associated with a first chunk identifier in a predetermined order to the client and to wait a predetermined period (in this case two seconds) before delivering chunks of different bitrates associated with the subsequent chunk identifier.

It is submitted that the chunk template parameters and the associated order, range and/or time attributes are just exemplary embodiments and that embodiments with other chunk template parameters associated with quality and/or presentation time attributes may also be used in order to request a predetermined order of chunks from one or more delivery nodes.

When generating an HTTP subscribe message, the client knows that the transmission of this message to a delivery node is equivalent to the transmission of a predetermined number of HTTP chunk request messages in a predetermined sequence to the delivery node. Hence, after transmission of the HTTP subscribe message, the client keeps the connection open and waits to receive a number of HTTP response messages that correspond to the number of requests that are being generated or emulated by the subscription translator in response to the HTTP subscribe message (step 208). In an embodiment, the client may link a response that it received to one of the (generated or emulated) HTTP chunk request messages (associated with the HTTP subscribe message) on the basis of the (time) order the HTTP response messages are received by the client. For example, in an embodiment, the client may associate the first HTTP chunk request message in the sequence of HTTP chunk request messages that were generated by the subscribe translator with the first response message that was received by the client in response to the subscription request message.

Hence, as described above, the subscription translator in the delivery node may use the chunk request template parameters in order to translate the HTTP subscribe message into a sequence of, in this example six, HTTP chunk request messages (i.e. six "conventional" HTTP GET messages) (step 210):

HTTP GET movie/movie_c234_q800.mp4;
HTTP GET movie/movie_c234_q1000.mp4;
HTTP GET movie/movie_c234_q1500.mp4;
HTTP GET movie/movie_c235_q800.mp4;
HTTP GET movie/movie_c235_q1000.mp4;
HTTP GET movie/movie_c235_q1500.mp4.

Depending on the implementation the subscription translator may use the chunk template and the chunk template parameters in order to generate a sequence of HTTP GET messages (as listed above) or a sequence of URLs that are used to emulate a sequence of HTTP GET messages. As the Bandwidth chunk template parameter was given priority over the Number chunk template parameter, the delivery node may send the three responses (steps 212,214,216) each comprising a different bitrate variant of one chunk. Then, on the basis of the time parameter (time attribute) associated with the Bandwidth chunk template parameter, the delivery node may wait a predetermined time (step 218) (in this case two seconds) before sending the next three responses (steps 220,222,224).

The above-described scheme may be applied to different types of chunked content, including content that is both temporarily and spatially segmented (sometimes also referred to as "tiles"). For example, in an embodiment, the HTTP subscribe message for a segmented video wherein its frames are spatially divided in 2×2 tiles (associated with tile coordinates (1,1),(1,2)(2,1)(2,2)) may have the following format:

HTTP GET movie/movie_c{Number}_q{Bandwidht}_x{XID}_y{YID}.mp4 HTTP/1.1
  Host: www.deliverynode.com
  Number: 4;234;2s
  Bandwidth: 3;1000,1500;0s
  XID: 2;1-2;0s
  YID: 1;1-2;0s Besides the Number and Bandwidth chunk template parameters, the HTTP message may further comprise two chunk template parameters XID and YID that determine the tile coordinates of the tile stream that is requested.

The subscription message may be interpreted by the description translator in the delivery node, determining that for a first chunk identifier (Number) tiles (1,1), (1,2), (2,1) and (2,2) need to be requested in a first and second bitrate version (Bandwidth). Hence, this HTTP subscribe message may be translated (or emulated) in a sequence of eight chunk request messages. As the YID chunk template parameter has the highest priority (priority 1) first the chunk request message associated with tiles (1,1) and (1,2) of the first bitrate version are generated. Subsequently, XID is increased (priority 2) so that the chunk request messages associated with tiles (2,1) and (2,2) in the first bitrate version are determined. Finally, the Bandwidth parameter is increased (priority 3) and all four tiles of the second bitrate version are generated in the same order as described above with respect to the first bitrate version:

HTTP GET movie/movie_c234_q1000_x1_y1.mp4
HTTP GET movie/movie_c234_q1000_x1_y2.mp4
HTTP GET movie/movie_c234_q1000_x2_y1.mp4
HTTP GET movie/movie_c234_q1000_x2_y2.mp4
HTTP GET movie/movie_c234_q1500_x1_y1.mp4
HTTP GET movie/movie_c234_q1500_x1_y2.mp4
HTTP GET movie/movie_c234_q1500_x2_y1.mp4
HTTP GET movie/movie_c234_q1500_x2_y2.mp4

The subscription request message according to the invention thus may be easily determined on the basis of the manifest file for any type of segmented (chunked) content wherein a single HTTP request may be used to request a delivery node for delivery of a sequence of (spatial, temporal and/or quality) chunks.

It is submitted that the HTTP subscribe message as described with reference to FIGS. 2A and 2B is just one example and other message formats are discussed hereunder in more detail with reference to FIGS. 11 and 12.

FIGS. 3A and 3B depict schematics of a streaming client and an associated delivery node that are configured to process an HTTP subscribe message as described within this disclosure. FIG. 3A depicts a user device according to an embodiment of the invention. The user device 300 may comprise a client 302, preferably an (HTTP Adaptive Streaming (HAS) client, which is configured for communicating with one or more network nodes, e.g. (media) servers such as a delivery node or a cache, and for streaming chunked content on the basis of an adaptive streaming protocol. The user device may generally relate to a content processing device, e.g. a (mobile) content play-out device such as an electronic tablet, a smart-phone, a notebook, a media player, etc. In some embodiment, a user device may be a set-top box or content storage device configured for processing and temporarily storing content for future consumption by a content play-out device.

As illustrated in FIG. 3A, the information in the manifest file may be stored in a manifest cache 310 and parsed by the client in order to generate HTTP request messages, such as (conventional) HTTP chunk request messages for requesting a particular chunk from a delivery node and the HTTP subscribe message as described above. These messages may be sent by the client via an HTTP interface to a delivery node. In order to form the HTTP subscribe message, the client may comprise a subscription generator module 312 that uses information from the manifest file, e.g. a chunk template and chunk template parameters, in order to generate an HTTP subscribe message.

The client may be further configured to receive a predetermined sequence of HTTP response messages 306 associated with a HTTP subscribe message and temporarily store these chunks in a buffer 314. The chunks may be retrieved using a (chunk) transfer protocol (typically this would be HTTP, but also RTSP/RTP, FTP and other protocols could be used) A video play-out function 316 (which may also referred to as the media engine) may play-out chunks stored in the buffer on the basis of information, e.g. Segment Timeline information, in the manifest file.

The chunk retrieval function may be configured to retrieve chunks such that the buffer is loaded with a predetermined number of chunks before play-out is started. Furthermore, during play-out, the client continuously retrieves chunks on the basis of the manifest file so that sufficient chunks are stored in the chunk buffer. The client may accept and handle chunk retrieval instructions from a user navigation function 330 that is connected to a (graphical) user interface (not shown) of the user device. This way, a user is able to navigate through the chunks as defined by the manifest file.

FIG. 3B depict schematics of a network node such as a delivery node that is configured to process an HTTP subscribe message according to various embodiments of the invention. The delivery node 320 may comprise a standard HTTP server 322 for handling HTTP requests and responses 324,326,328. The HTTP server may be configured to filter out HTTP subscribe messages 330, which are forwarded to the subscription translator module 332. The translator component transforms HTTP subscribe messages into a predetermined sequence of HTTP chunk requests 334 using the chunk template and the chunk template parameters as explained in detail with reference to FIG. 2.

In an embodiment of the invention, an HTTP request timer module 338 may keep track of the order of the requests that need to be sent out, and, in some embodiments, also the time when a chunk request has to be answered (responded to). To that end, the HTTP messages may comprise timing information (e.g. a time stamp) in the request message and one or more time parameters (e.g. time attributes) associated with the chunk template parameters in the HTTP message. In an embodiment, the HTTP request timer module 338 may be configured to pass a timed HTTP chunk request to the HTTP server on the basis of a time (e.g. provided by a clock signal). In response to the HTTP chunk request, the HTTP server may generate a HTTP response message 324 comprising the requested chunk, which may be (temporarily) stored in a content database 330 according to the one or more time attributes (time parameters).

It should further be noted that the examples provided in FIG. 3A and FIG. 3B may be equally applied in a WebSocket based request-response mechanism. The HTTP messages are then substituted for WebSocket messages (e.g. messages based on the WebSocket format). An example of the syntax of these messages has been described in this application. Both the client and server are then configured for setting up (e.g. upgrading to) a WebSocket connection, which is used for requesting and/or retrieving chunks.

Figure 4:
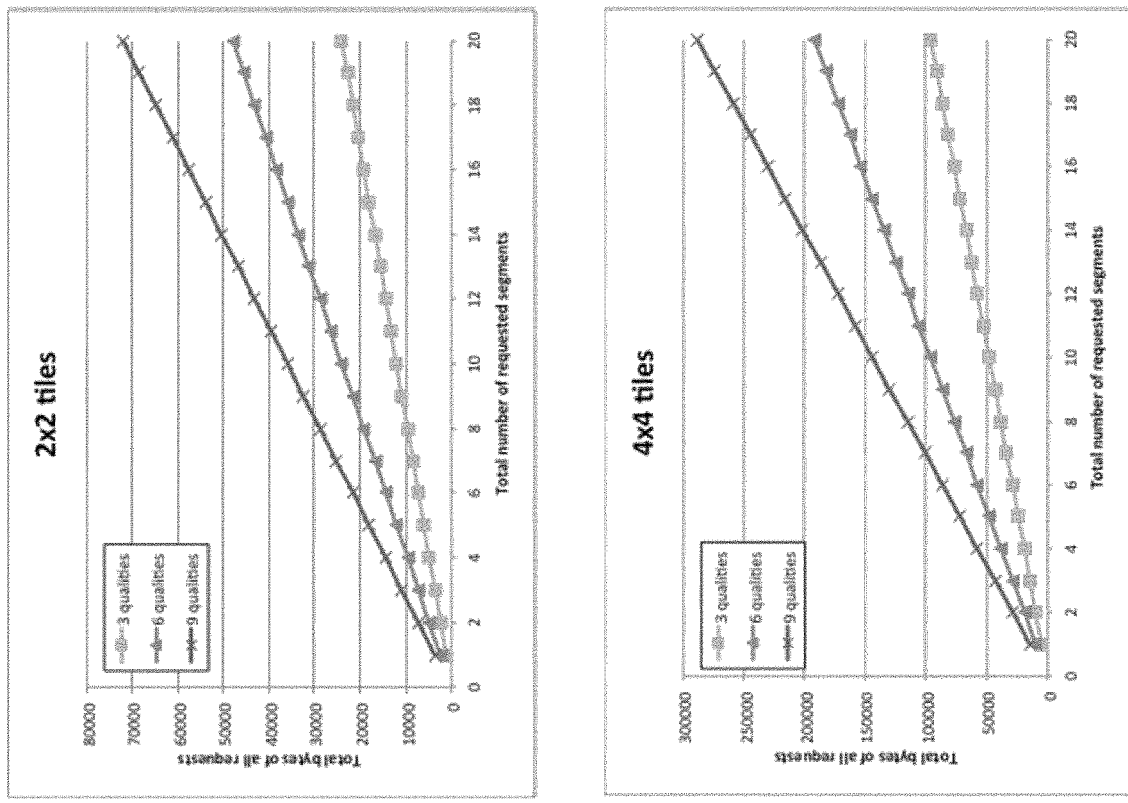
FIG. 4 depicts various graphs illustrating the overhead that is produced during the streaming of chunked content.

FIG. 4 depicts various graphs illustrating the overhead that is produced during the streaming of chunked content using conventional HTTP chunk request messages. In a real-life situation, the overhead is difficult to calculate, as it will depend on the physical layer (e.g., Ethernet) that is used. Protocols associated with the physical layer (of the OSI model) may add overhead and fragment the TCP stream in different ways (e.g., Ethernet adds 18 bytes overhead and splits the TCP stream in 1500 byte data packets). Hence, in the calculations only the IP, TCP and HTTP overhead were considered.

The IP and TCP header overhead is minimum 20 bytes each. The HTTP overhead depends on the actual header fields and URL length. By way of example, we use the following minimal HTTP request for a tiled streaming example:
GET movie/movie_c001_q1_x1_y1.mp4
Host: www.deliverynode.com
This request is about 60 bytes in size. The subscription request would look like this:
GETmovie/
movie_c{Number}_q{RepresentationID}_x{XID}_y{YID}.mp4
Host: www.deliverynode.com
Number: 4;001-010;2s
RepresentationID: 3;1-3;0s
XID: 2;1-4;0s
YID: 1;1-4;0s
This request is 134 bytes. The two graphs in FIG. 4 depict the size of requests (in bytes) using the traditional HTTP GET approach, as a function of the number of requested chunks (X axis) and number of requested quality layers (curves) in an SVC-based tiled streaming scenario. The first graph shows results for a video consisting of 2×2 tiles, while the second graph shows results for a 4×4 tiled video.

Obviously, the number of requests, and therefore requested bytes increases linearly with all three variables. For example, requesting 3 quality layers of 20 chunks for a 2×2 tiled video would require 23 MB, while requesting the same for a 4×4 video would already require 93 MB. When multiplying these numbers with the total number of chunks that need to be requested and the number of clients in the network, a huge amount of overhead associated with the number of requests will be created.

In contrast, the total number of bytes of a subscription would be 174 (i.e., 0.16 MB) in this case, independently of the number of requested quality layers, tiles, or segments. Note that minimal values were used for this calculation, so that overhead in a real-life situation will be significantly higher.

Figure 5:
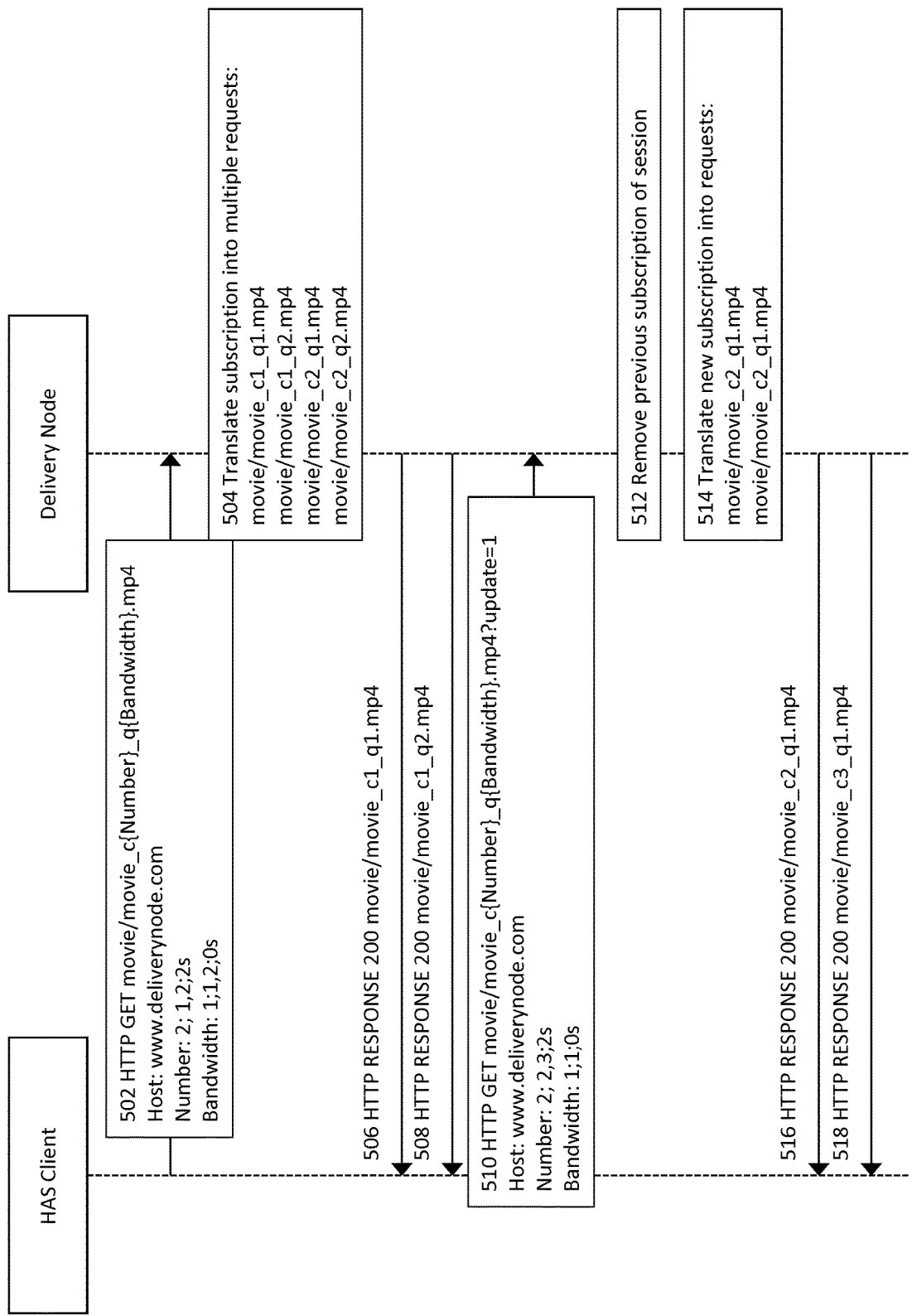
FIG. 5 schematically depicts a method for delivering multiple chunks to an adaptive streaming client according to another embodiment of the invention.

FIG. 5 schematically depicts a method for delivering multiple chunks to an adaptive streaming client on the basis of one chunk request message according to another embodiment of the invention. In particular, FIG. 5 schematically depicts the generation and transmission of a first HTTP subscribe message to a delivery node and a subsequent update of the subscribe request during the processing of the HTTP subscribe message by the delivery node.

The process may start in a similar way as described with references to steps 200-214 of FIG. 2A. In particular, the HAS client may sends a HTTP subscribe message for the retrieval in two different quality layers of two chunks to the delivery node (step 502). The HTTP subscribe message may be translated into a sequence of four HTTP chunk request messages by the subscription translator in the delivery node (step 504). Thereafter, the delivery node may send the two (SVC) quality layers of the first chunk to the client (steps 506 and 508).

Meanwhile, after having received the two SVC variants of the first chunk, the client may determine that it is no longer interested in the second quality layer (e.g., because it noticed that the available bandwidth does not suffice to support it). Therefore, the client may send a new, second HTTP subscribe message over the persistent connection for retrieving only the base layer of chunks 2 and 3 (step 550).

The delivery node may identify that the second HTTP subscribe message belongs to the same session as the earlier HTTP subscribe message and determines that the second HTTP subscribe message relates to an update of the first HTTP subscribe message rather than a new request.

The delivery node may determine if a request is an update in several different ways. For example, in an embodiment, each HTTP subscribe message may be identified by an unique identifier and sending an second HTTP subscribe message using the same identifier may trigger the delivery node to interpret the second HTTP subscribe message as an update message. In another embodiment, a parameter named "update" may be added to the query-string of the request URL. If the value is set to a predetermined value, e.g. "1", then the request is an HTTP subscribe update message. If the "update" parameter is "0" or the query-string is not present, the HTTP subscribe message is not an update. In other embodiment, the "update" parameter may be inserted into the header of the HTTP message.

In case the HTTP message is an HTTP subscribe update message, the delivery node may remove the requests associated with the earlier first HTTP subscribe message of the session (step 512). The identification of the session may also be implemented in multiple ways, including a token- or cookie-based scheme (examples of such session identification schemes are described hereunder in more detail with reference to FIGS. 8 and 9). The new HTTP subscribe message may be translated by the subscription translator in the delivery node into two new HTTP chunk request messages (step 514). The HTTP server in the delivery node may respond to these messages by sending two HTTP response messages comprising the requested chunks to the client (step 516 and 518). As a consequence the chunk 'movie_c2_q2', which was requested as part of the original first HTTP subscribe request message, is never sent to the client and therefore this part of the original request is effectively cancelled.

In a further embodiment, instead of updating an HTTP subscribe message, the client may also decide to completely cancel a request using the same mechanism mentioned above. For example, in one embodiment, the client may send an empty HTTP subscribe message over the persistent connection to the delivery node, wherein the subscription translator in the delivery node may interpret such empty HTTP subscribe message as a complete cancellation of the earlier HTTP subscribe message. In a further embodiment, in the process of FIG. 5, the client may also decide to send a (second) HTTP chunk request message after the earlier first HTTP subscribe message to the delivery node. In that case, the HTTP requests associated with the first HTTP subscribe message may be replaced by a single HTTP chunk request.

Figure 6:
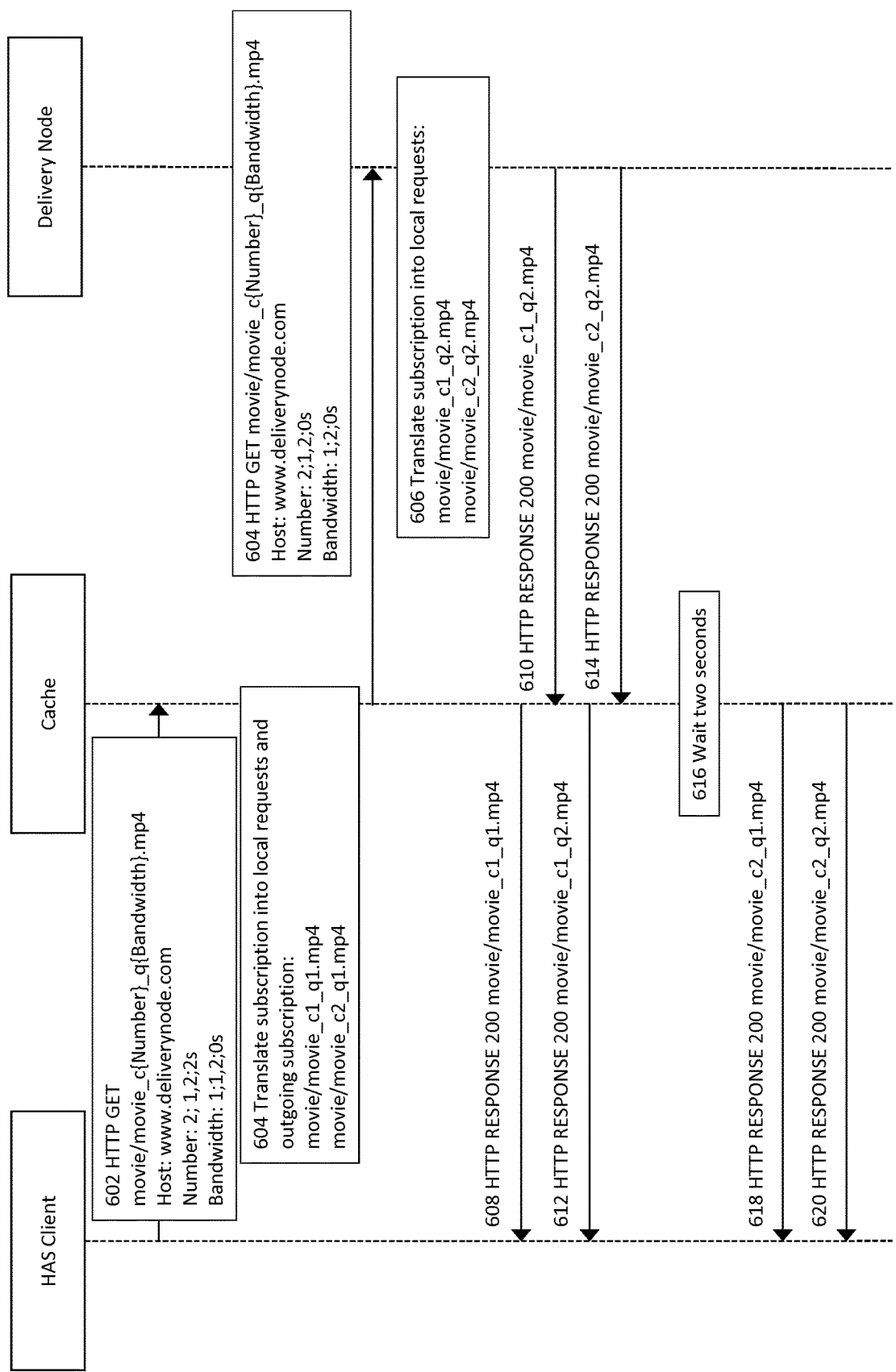
FIG. 6 schematically depicts a method for delivering multiple chunks to an adaptive streaming client according to yet another embodiment of the invention.

FIG. 6 depicts a method for delivering multiple chunks to an adaptive streaming client on the basis of one chunk request message according to yet another embodiment of the invention. In particular, FIG. 6 depicts a method for delivering multiple chunks (such as SVC chunks) on the basis of a single HTTP GET message to a streaming client. In this particular case, a HTTP proxy cache that supports the subscription request scheme according to the invention may be positioned within the path between the client and the delivery node.

The process may start with a client requesting the delivery of multiple chunks, e.g. two quality layers of a chunk that is identified by a chunk identifier, using a first HTTP subscribe message (step 602) that is generated on the basis of information in the manifest file by the subscription generator in the client in a similar way as described in detail with reference to FIGS. 2A and 2B:

HTTP GET movie/movie_c{Number}_q{Bandwidth}.mp4
Host: www.deliverynode.com
Number: 2;1,2;2s
Bandwidth: 1;1,2;0s A first (persistent) connection between the client and the cache may be established and the HTTP subscribe message may be sent to the cache via the connection. The HTTP server of the cache may forward the HTTP subscribe message to the subscription translator in order to translate the message and in order to check whether the cache is capable of delivering one or more of the requested chunks. To that end, it may check whether the requested chunks are stored in the content database of the cache. In this particular example, the cache may have stored the two chunks of the first quality layer, and thus the subscription translator in the cache may translate the HTTP subscribe message into at least two (local) HTTP chunk request messages for delivery of a first and second chunk of a first quality layer by the cache to the streaming client:

HTTP GET movie/movie_c1_q1.mp4
HTTP GET movie/movie_c2_q1.mp4

For the remainder of the requested chunks, i.e. the chunks of the second quality layer that are not stored in the cache, a subscription generator in the cache may generate a further, second HTTP request message for requesting the delivery node (the destination of the original (first) HTTP subscribe message) to deliver the remainder of the chunks to the client (step 604):

HTTP GET movie/movie_c[Number]_q[Bandwidth].mp4
Host: www.deliverynode.com
Number: 2;1,2;0s
Bandwidth: 1;2;0s Hence, in this embodiment, the cache is both configured to translate the first HTTP subscribe message into (local) HTTP chunk request message and to generate a second HTTP subscribe message for one or more chunks that are not present in the cache. If that is the case, the cache may set up a second (persistent) connection with the delivery node and send the second HTTP subscribe message to the delivery node.

After having been sent by an HTTP client in the cache to the delivery node, the second HTTP subscribe message may be translated by a subscription translator (in the delivery node) into two (local) chunk request messages for delivery of the first and second chunk of the second quality layer to the client (step 606). In response to the second HTTP subscribe message, the delivery node may send two HTTP response messages comprising the requested chunks back to the cache, which may send the HTTP responses associated with the first and second HTTP subscribe messages to the client.

In order to comply with the timing and order of the responses as requested by the client, a HTTP request timer module in the cache may manage the timing of the HTTP subscribe message(s) it sends to the delivery node and the HTTP chunk requests it sends to the client. The timing of the HTTP messages may include local storage of the generated HTTP responses until the time comes to send the responses to the client in the order as requested.

In the exemplary embodiment of the invention according to FIG. 6, the cache may already start sending the HTTP response comprising chunk 1 of quality layer 1 as soon as the cache has processed the first HTTP subscribe message. Moreover, the cache may forward any chunks it receives from the delivery node without having to wait for subsequent chunks from the delivery node. In other words, in the example of FIG. 6, the HTTP responses originating from the cache and HTTP responses originating from the delivery node can be sent to the client in an interleaved way.

Figure 7:
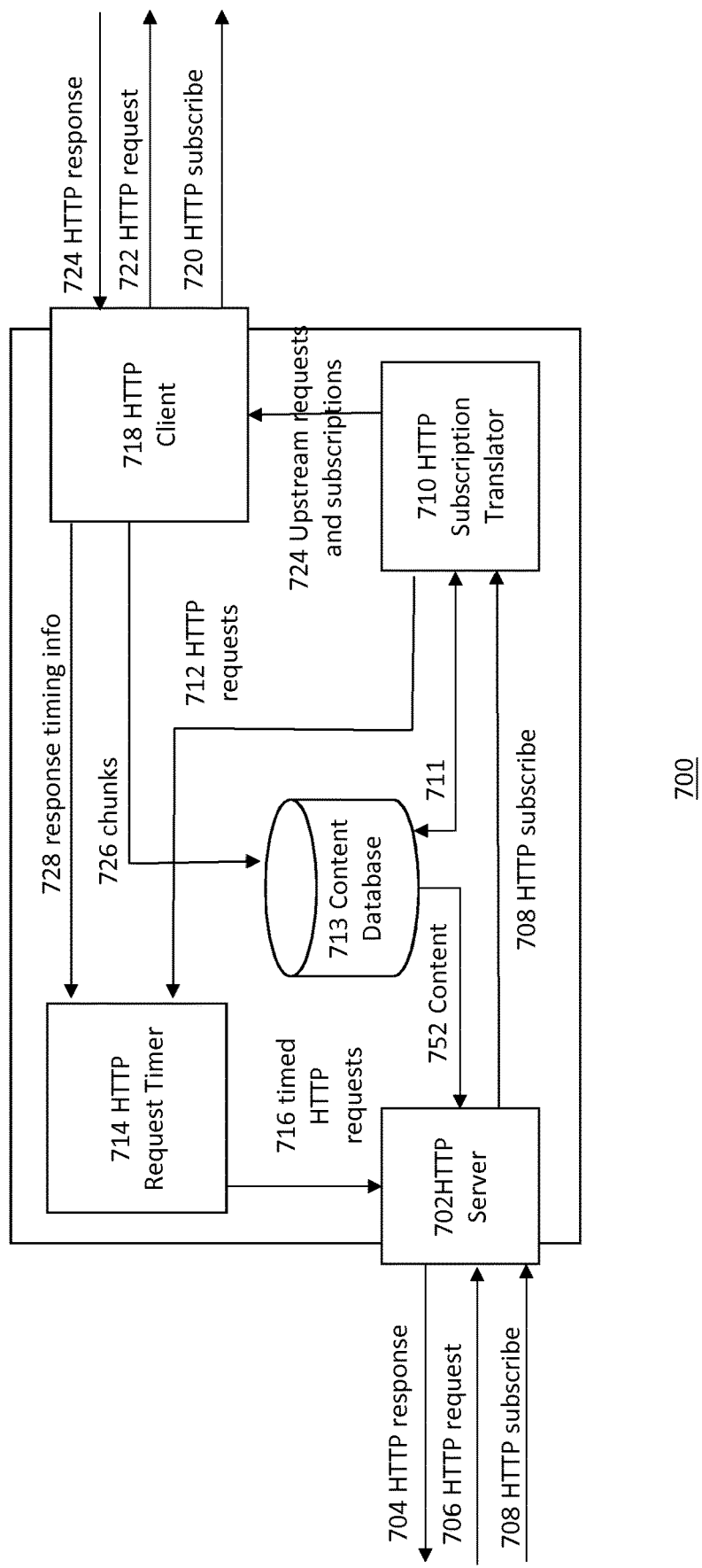
FIG. 7 depict schematics of a delivery node (or cache) that is configured to process subscription request messages according to various embodiments of the invention.

FIG. 7 depicts schematics of a cache 700 that is configured to process an HTTP subscribe message according to various embodiments of the invention. The skilled person will realize that the (type of) chunks referred to in the context of FIG. 7 are segments, since these may be individually stored as files, unlike fragments which are chunks stored (e.g. contained) in multiples within a file. Thus fragments can generally not be stored 'stand alone' in a storage facility such as a cache, which may impact the efficiency of distribution. In an embodiment, the HTTP cache server in FIG. 7 may be configured to process HTTP subscribe messages as described in detail with reference to FIG. 6. Similar to the delivery node in FIG. 3B, the cache 700 may comprise a standard HTTP server 702 for handling HTTP requests and responses 704,706,708. The HTTP server may be configured to filter out HTTP subscribe messages 708, which are then forwarded to the subscription translator module 710.

A subscription translator may determine which chunks are requested by the HTTP subscribe message and to check whether (at least part of) these chunks are stored in a content database 713 of the cache. In case some of the chunks are stored in the cache, the subscription translator may transform the initial first HTTP subscribe message into a predetermined sequence of HTTP chunk requests 712 associated with the chunks that are stored in the content database. In order to generate these HTTP requests, the subscription translator may use the chunk template and the chunk template parameters as explained in detail with reference to FIG. 2.

The thus generated HTTP requests may be sent to the HTTP request timer module 714, which may keep track of the order of the requests that need to be sent out, and, in some embodiments, also the time when a chunk request needs to be answered. In an embodiment, the HTTP request timer module 714 may be configured to pass a timed HTTP chunk request 716 to the HTTP server on the basis of a time (e.g. provided by a clock signal). In response to the HTTP chunk request, the HTTP server may generate a HTTP response message 704 comprising the requested chunk, which may be stored in a content database 713.

With respect to the chunks that were not stored in the content database of the cache, the subscription translator 710 may modify the initial first HTTP subscribe message into a second (upstream) HTTP subscribe message 724 and send the second HTTP subscribe message 720 to the delivery node that was identified in the initial first HTTP subscribe message. The modified HTTP subscribe message thus only requests the chunks (segments) which are not present in the cache. Alternatively, the subscription translator may decide to request the chunks that were not stored in the content database on the basis of one or more (upstream) HTTP chunk requests (i.e. conventional HTTP request messages) and send these HTTP requests to the client for sending these request messages 722 to the delivery node.

In case none of the chunks in the initial first HTTP subscribe message are stored in the cache, the HTTP subscription translator may forward the HTTP chunk request to a HTTP client 718 in the cache, which will send the HTTP subscribe message to the delivery node. The HTTP client may be further configured to receive HTTP responses 724 back from delivery nodes and/or other network nodes. HTTP responses that comprise a chunk are filtered and the content 726 of the chunks is stored in the content database together with metadata e.g. a chunk identifier and/or an URL, so that the content can be retrieved by the HTTP server 702. In an embodiment, the HTTP client may also be configured to send response timing information (e.g. timestamp information) associated with the reception of HTTP responses by the client to the HTTP request timer module 714. In a further embodiment, the HTTP request timer module may be configured to use the response timing information for determining at what time responses may be sent by the HTTP server to a client. This way, the cache server is able to send chunks that were stored in the cache and chunks that originate from the delivery node in the correct order to the client.

Figure 8:
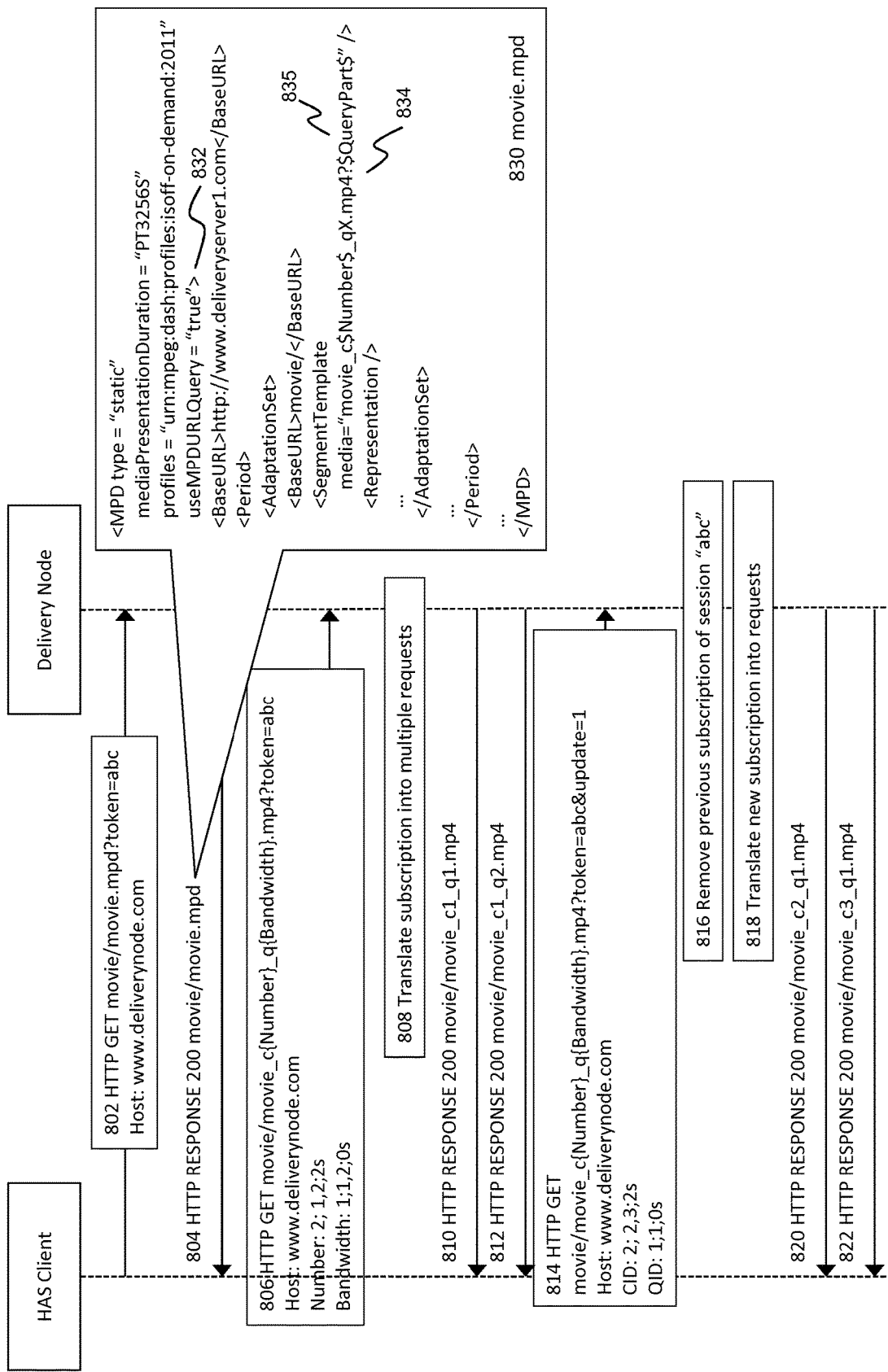
FIG. 8 depicts a method for delivering multiple chunks to an adaptive streaming client on the basis of one chunk request message according to a further embodiment of the invention.

FIG. 8 depicts a method for delivering multiple chunks to an adaptive streaming client on the basis of one chunk request message according to a further embodiment of the invention. In order to support changing and cancelling of HTTP subscribe messages, the HTTP server needs to be able to identify clients and link subscription requests (HTTP request messages) together (e.g. make the association). In some cases, this could be done on the basis of the TCP connection. However, in other cases, such as an intermediary non-transparent proxy this is not possible. Moreover, HTTP clients and/or servers cannot be forced to keep their connection open. Hence, when a connection is closed, a client and/or server should be able to link requests and responses associated with one particular streaming session. This problem can be solved in several ways. In the embodiment of FIG. 8 tokens are used in order to identify requests and responses.

FIG. 8 depicts a similar flow as described with reference to FIG. 5, wherein a client is configured to send an HTTP subscribe update message in order to update an HTTP subscribe message that was sent earlier. In this embodiment however, the client includes a token as a query parameter in the URL of the HTTP messages. For example, as shown in FIG. 8, the client may request an MPD associated with chunked content from a network node (e.g. a delivery node) wherein the request URL of the HTTP GET message comprises a query parameter "token=abc", where "abc" is a unique identifier of the client session (step 802).

The client subsequently receives the MPD file 830 in a response message (step 804), wherein the MPD file includes an additional token parameter "useMPDURLQuery=true", which instructs the client that it should add the client session token in the request URLs of the subsequent HTTP chunk requests. To that end, the chunk template 834 in the MPD may comprise an additional chunk template parameter field $QueryPart$ that instructs the client to add the token as a query string to a request URL. Additionally, the token parameter may instruct the client that it should add the client session token as a query string to the request URL of the HTTP subscribe message.

When the client generates an HTTP subscribe message, it adds the "token=abc" part of the original MPD URL to the request URL, as denoted by the $QueryPart$ parameter in the MPD file, before sending it to the delivery node (step 806). The delivery node may translate the HTTP subscribe message into multiple HTTP single chunk request messages and link those messages to the token value "abc" in order to uniquely identify the client session. Hence if, after having received two responses (steps 810 and 812), the client transmits to the delivery node an HTTP subscribe message with the "update=1" and the "token=abc" queries attached to its request URL (step 814), the delivery node may link this HTTP subscribe update message (and its associated HTTP chunk requests) to a previous HTTP subscribe message (and associated HTTP chunk request messages) with the same token, and select the previous HTTP subscribe message for replacement with the update (step 816), which may include removal of HTTP chunk requests of the previous HTTP subscribe message that were not yet processed by the delivery node. Thereafter, the process may continue with the delivery process, including translation of the HTTP subscribe message into a sequence of HTTP chunk requests and sending in response to these HTTP chunk requests responses to the client (steps 818-822).

The update parameter for instructing a network node to update a HTTP subscribe message may be inserted in an HTTP request message in various ways. In an embodiment, the update parameter may be inserted as a token or a cookie in the HTTP message in a similar way as described above with reference to the chunk template parameters. Alternatively, the update parameter may be inserted in an HTTP request message as a query string.

Figure 9:
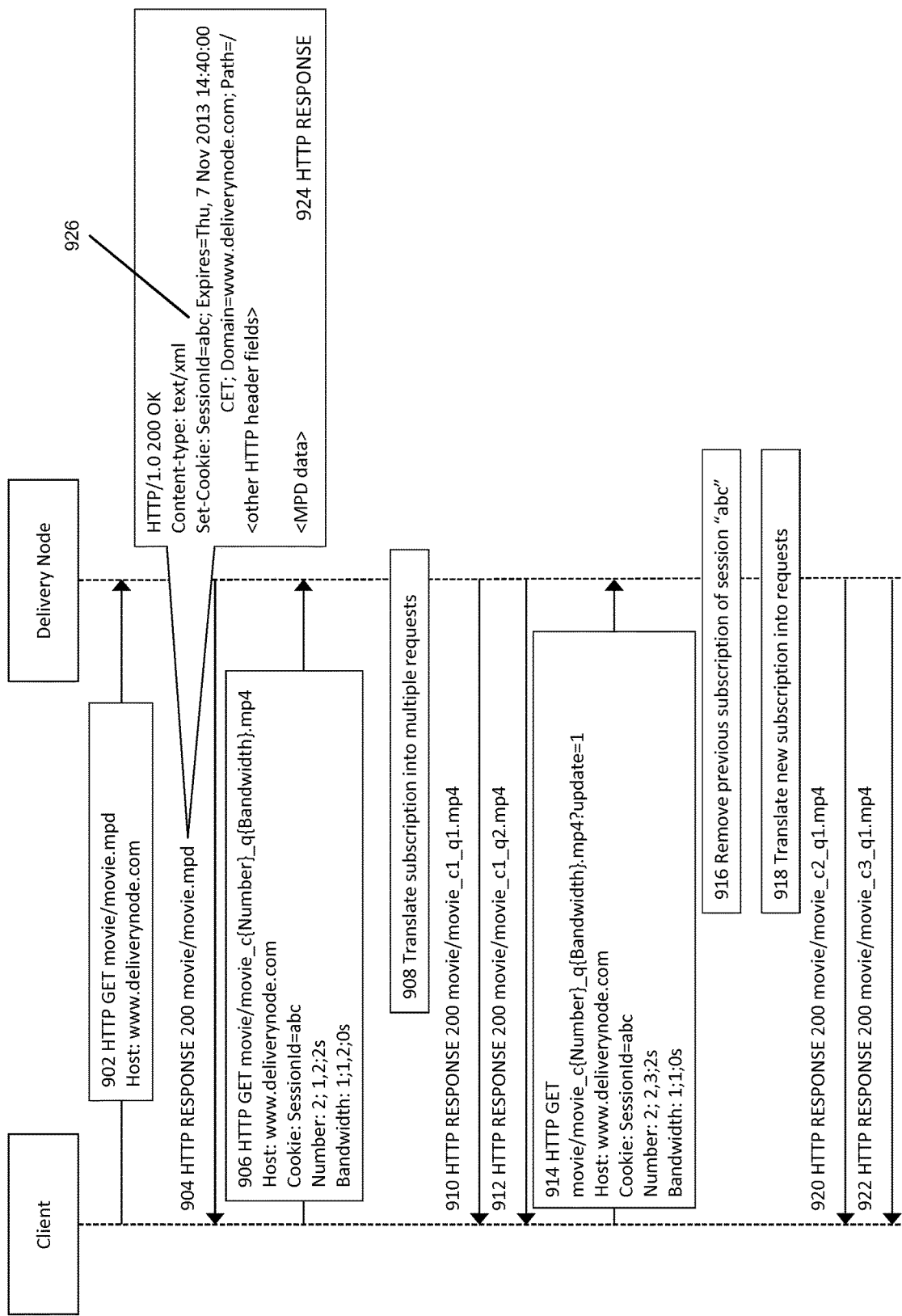
FIG. 9 depicts a method for delivering multiple chunks to an adaptive streaming client on the basis of one chunk request message according to another embodiment of the invention.

FIG. 9 depicts a method for delivering multiple chunks to an adaptive streaming client on the basis of one HTTP subscribe message according to an embodiment of the invention. In this particular embodiment, instead of using a client session token (as described with reference to FIG. 8) a cookie is used for client session identification.

When the client requests an MPD from a network node such as a delivery node (step 902), the delivery node may set the "Set-Cookie" header field 926 in the HTTP response 924 that comprises the MPD data. The header field may comprise the cookie name "SessionId" and cookie value "abc". The value represents the unique identifier of the client session. Once the HTTP response message is received by the client, the client may add a "Cookie" header field, with the received session identifier to any subsequent HTTP chunk request message or HTTP subscribe message so that the delivery node is able to correlate the different HTTP subscribe messages and HTTP requests and responses. For example, the client may generate an HTTP subscribe message comprising a cookie header in which the SessionID is given the value abc and send the HTTP subscribe message to the delivery node (step 906). Similarly, the client may generate an HTTP subscribe update message comprising the same cookie header and send it to the delivery node, which may use the cookie value to relate this subscribe update message to the earlier subscribe message.

Figure 10:
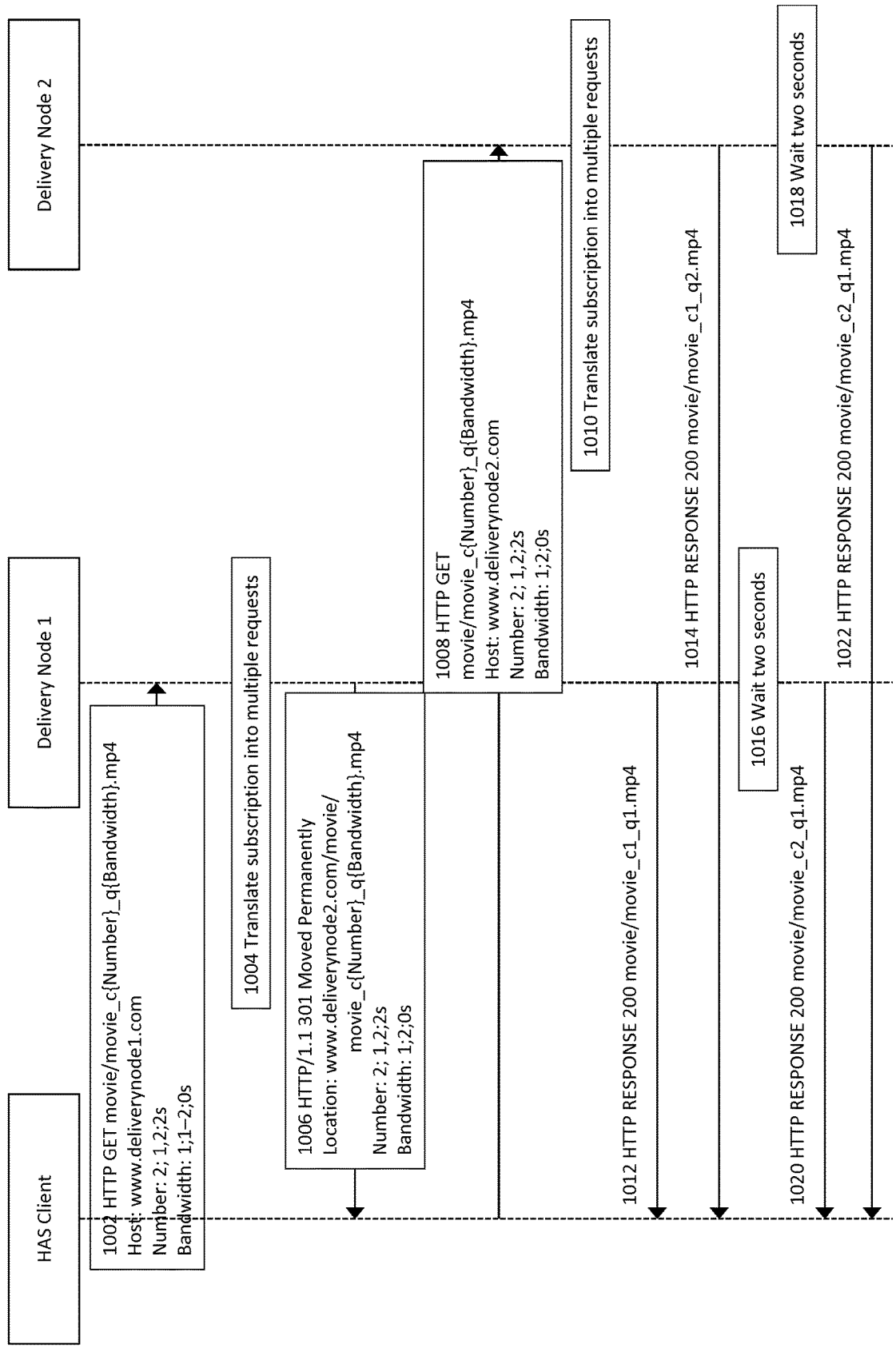
FIG. 10 depicts a method for delivering multiple chunks to an adaptive streaming client on the basis of one chunk request message according to a yet another embodiment of the invention.

FIG. 10 depicts a method for delivering multiple chunks to an adaptive streaming client on the basis of a single request message (e.g. on the basis of the HTTP subscribe message) according to an embodiment of the invention. In a content delivery network (CDN), a request router or delivery node may redirect HTTP request messages to another node in the CDN. In case of an HTTP subscribe message a redirection scheme cannot be straightforwardly implemented, as a single HTTP subscribe message may refer to multiple HTTP requests that may each require a different redirect. Moreover, the known HTTP protocol implementation requires a single redirection message per sent request. FIG. 10 depicts, in an aspect of the invention, a method wherein the known HTTP redirection principle is extended to HTTP subscribe message-based responses.

In this exemplary embodiment the client may first send a first HTTP subscribe message to a first delivery node for requesting two different SVC layers, e.g. a base layer and an enhancement layer, for two chunks (step 1002). The first delivery node may translate the HTTP subscribe message (step 1004) and determine that it can only delivery the two base layer chunks to the client. As such, it may redirect the client to the second delivery node for requesting the two enhancement layer chunks. The HTTP redirection message may be implemented in the form of a HTTP response message comprising an redirection URL comprising at least part of the resource location path to a second delivery node and the chunk template. Here the second delivery node may be capable of delivering the chunks that cannot be delivered by said first delivery node to said client. The HTTP redirection message may further comprise one or more second chunk template parameters for defining the one or more chunks that cannot be delivered by said first network node. In this particular example, the second chunk template parameters have the same semantics as the chunk template parameters of the original HTTP subscribe message, except for the fact that the QID template parameter now only refers to the second (enhancement) layer (step 1006). In response to the HTTP subscribe redirection message, the client may send a new, second HTTP subscribe message for requesting the enhancement layer chunks, to the second delivery node (step 1008) wherein the HTTP subscribe message comprises a request URL and chunk template parameters that correspond to the redirection URL and the second chunk template parameters in the redirection message. Finally, the first and second delivery nodes may deliver the requested content in a predetermined order to the client (steps 1012-1022).

FIG. 11 depicts a manifest file and an associated HTTP subscribe message according to an embodiment of the invention. The manifest file may comprise a subscription support parameter, in the example denoted as supportSubscription 1102, which indicates whether the content delivery system, e.g. a CDN (Content Delivery Network) or a single delivery node, supports HTTP subscribe messages, preferably including update and redirection messages according to the invention. If it does, the client, in particular the subscription generator in the client, may generate HTTP subscribe messages, HTTP subscribe update messages and/or respond to HTTP subscribe redirection messages on the basis of the chunk template 1106. In a further embodiment (not shown), support of the update and/or redirection scheme according to the invention, may be signalled in the manifest file on the basis of separate parameters such as support subscription update parameter and a support subscription redirection parameter. Several formats of such HTTP subscribe message are shown in FIG. 11.

For example, in an embodiment, the client may use the chunk template and the base URLs in the manifest file in order to form a request URL movie/movie_c{Number}_q1.mp4, wherein the URL template movie_c{Number}_q1 is used by the translator module to generate or emulate a sequence of HTTP chunk request messages. Thereafter, an HTTP subscribe message 1108 may be formed comprising the request URL wherein a HTTP header may comprise the chunk template parameter Number and its attributes that are used by the subscription translator for defining chunk numbers for specific HTTP chunk request messages. In another embodiment, an HTTP subscribe message 1110 may be formed comprising the request URL wherein one or more chunk template parameters and their attributes (in this example the chunk template parameter Number) may be added to the URL, for example in the form of one or more query parameters.

FIG. 12 depicts a manifest file and associated HTTP subscribe message according to another embodiment of the invention. In FIG. 11 an HTTP subscribe format is employed that is based on HTTP header fields, wherein the server, in particular the translator module in the server, replaces variables between square brackets (or some other delimiter) with the values in the corresponding header field. FIG. 12 depicts an alternative approach wherein direct substitution is employed. Hence, also in this embodiment, the manifest file may comprise a subscription support parameter 1202 for indicating the client that the HTTP subscribe message is supported by the server. In addition, the manifest file may comprise a subscription format parameter 1204 for instructing the client what subscription method to use. In this case this method is substitution that indicates the one or more chunk template parameters fields in the URL template of the request URL of the HTTP subscribe message should be directly replaced with their respective attributes (in this case $Number$ is directly replaced with "1;1,2;2s").

It is noted that when using certain ascii characters (such as ";" and ",") in the URLs of the HTTP messages in this disclosure (such as in FIGS. 11 and 12) their encoded values may be used. Further, it is submitted that although the embodiments in FIG. 1-12 illustrate HTTP subscribe messages comprising both chunk template parameters and a chunk template, the invention also includes embodiments wherein the chunk template is provided to the network node (e.g. the delivery node or a cache) separately from the chunk template parameters, which are sent in the HTTP subscribe message to the network node.

Figure 13:
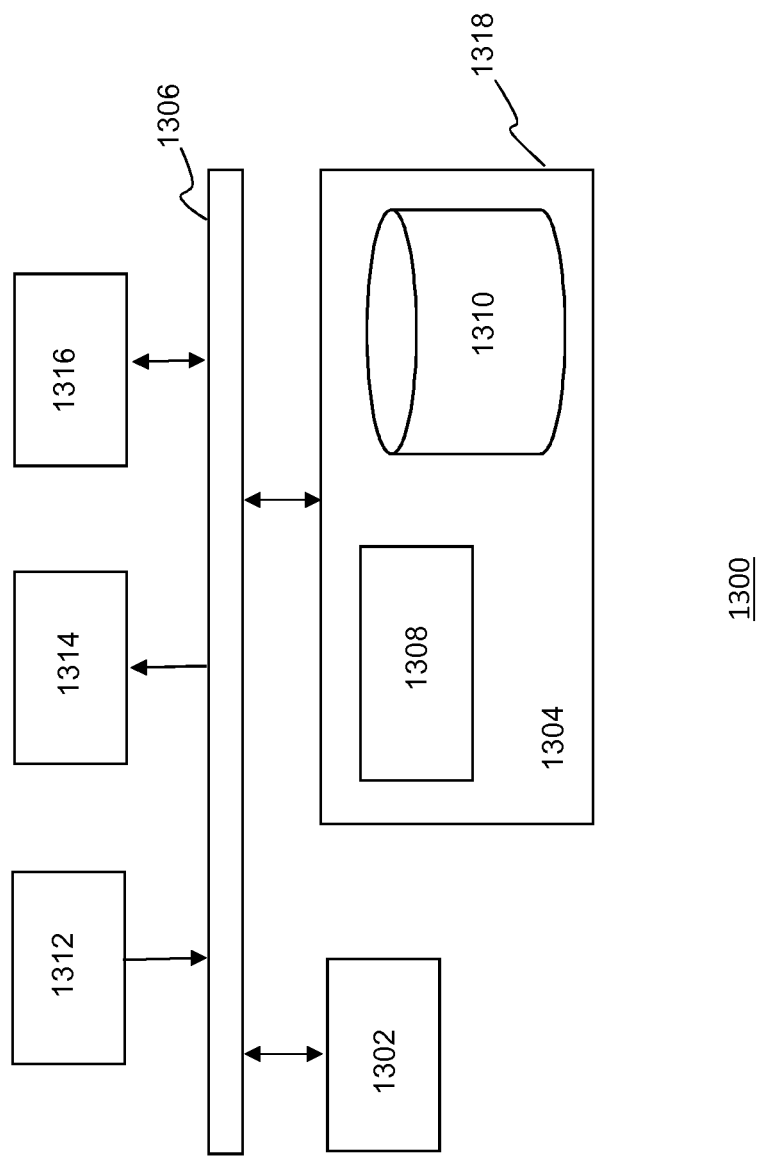
FIG. 13 is a block diagram illustrating an exemplary data processing system that may be used in systems and methods in this disclosure.

FIG. 13 is a block diagram illustrating an exemplary data processing system that may be used in systems and methods as described with reference to FIG. 1-12. Data processing system 1300 may include at least one processor 1302 coupled to memory elements 1304 through a system bus 1306. As such, the data processing system may store program code within memory elements 1304. Further, processor 1302 may execute the program code accessed from memory elements 1304 via system bus 1306. In one aspect, data processing system may be implemented as a computer that is suitable for storing and/or executing program code. It should be appreciated, however, that data processing system 1300 may be implemented in the form of any system including a processor and memory that is capable of performing the functions described within this specification.

Memory elements 1304 may include one or more physical memory devices such as, for example, local memory 1308 and one or more bulk storage devices 1310. Local memory may refer to random access memory or other non-persistent memory device(s) generally used during actual execution of the program code. A bulk storage device may be implemented as a hard drive or other persistent data storage device. The processing system 1300 may also include one or more cache memories (not shown) that provide temporary storage of at least some program code in order to reduce the number of times program code must be retrieved from bulk storage device 1310 during execution.

Input/output (I/O) devices depicted as input device 1312 and output device 1314 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1316 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 3150.

As pictured in FIG. 13, memory elements 1304 may store an application 1318. It should be appreciated that data processing system 1300 may further execute an operating system (not shown) that can facilitate execution of the application. Application, being implemented in the form of executable program code, can be executed by data processing system 1300, e.g., by processor 1302. Responsive to executing application, data processing system may be configured to perform one or more operations to be described herein in further detail.

In one aspect, for example, data processing system 1300 may represent a client data processing system. In that case, application 1318 may represent a client application that, when executed, configures data processing system 1100 to perform the various functions described herein with reference to a "client". Examples of a client can include, but are not limited to, a personal computer, a portable computer, a mobile phone, or the like.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Figure 14:
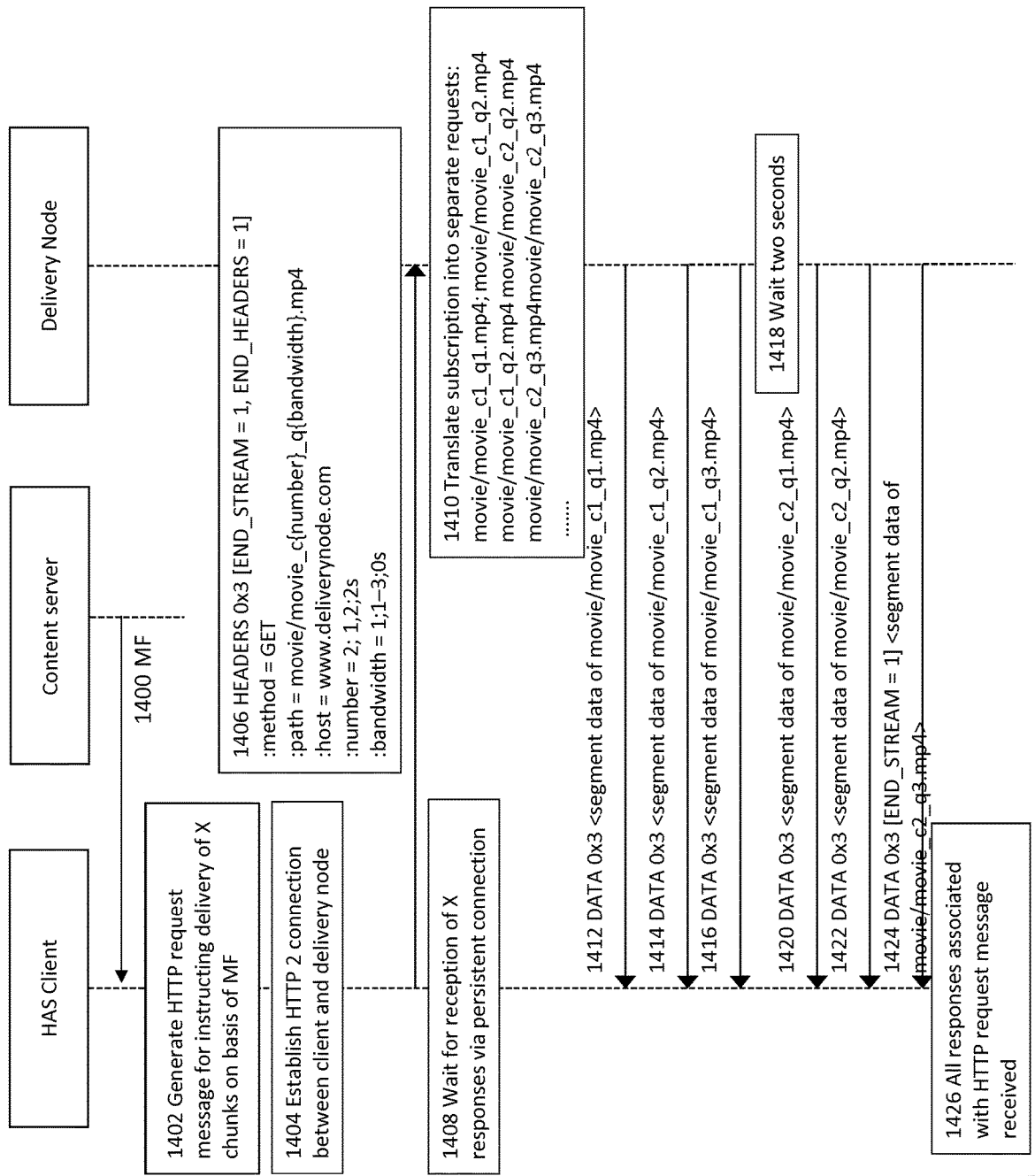
FIG. 14 depicts a method for delivering multiple chunks to an adaptive streaming client on the basis of one chunk request message according to yet another embodiment of the invention.

FIG. 14 depicts a method for delivering multiple chunks to an adaptive streaming client on the basis of one chunk request message according to an embodiment of the invention. In this particular embodiment, the same exchange as in FIG. 2A is shown, but using HTTP version 2 rather than HTTP version 1.1. As HTTP 2 supports push-based delivery of data, it lends itself well to the delivery of multiple segments based on a single request. In HTTP 2, the communication between client and server is performed using Frames (which may be referred to as HTTP 2 messages), sent over one or more Streams. In step 1406, a new stream, with ID 0x3, is implicitly created by the client when it sends a HEADERS Frame (HTTP (2) request message) to the delivery node with Stream Identifier 0x3. Instead of HEADERS Frame, the term HEADERS Frame message may be used. The "Stream Identifier" parameter may be used as (e.g. functions as) a session identifier according to embodiments of the invention.

The parameters of the request are similar to those in FIG. 2A, but shown using HTTP 2 syntax. Do note that HTTP 2 is in essence a binary format, but messages are shown in plain text for clarity. In step 1410, the delivery node once again performs the translation step. Subsequently it sends the requested segments to the client (steps 1412-1424). Each segment is a DATA Frame (e.g. a HTTP (2) response message) sent on Stream 0x3. Instead of DATA Frame, the term DATA Frame message may be used. Finally, when the last DATA Frame is sent, the delivery node sets the END_STREAM flag, notifying the client that all requested segments have been delivered.

Figure 15:
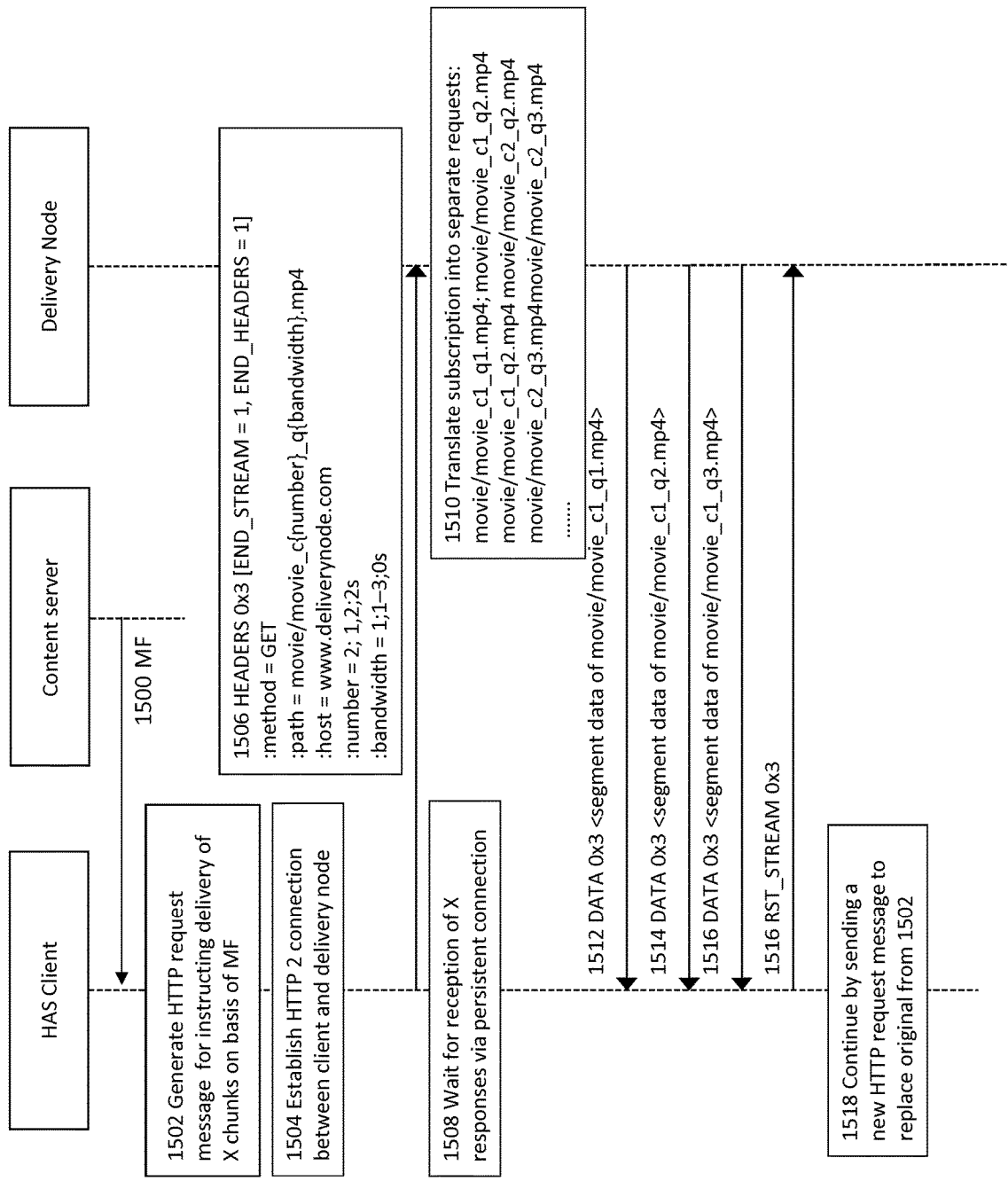
FIG. 15 depicts a method for delivering multiple chunks to an adaptive streaming client on the basis of two chunk request messages according to yet another embodiment of the invention.

FIG. 15 depicts a method for providing multiple chunks to an adaptive streaming client on the basis of two (chunk) request messages according to an embodiment of the invention. In this particular embodiment, it is shown how a subscription request (i.e. a request message for the delivery of multiple chunks) may be cancelled and/or modified by using built-in HTTP 2 facilities. Concretely, the client may easily cancel said request, even after a few chunks have already been delivered, by sending in step 1516 a RST_STREAM Frame with the Stream Identifier equal to the one from the original request (i.e. the HEADERS Frame of step 1506). This RST STREAM Frame message (HTTP cancel message) will close the stream, preventing the delivery node from sending any further segments (chunks). Subsequently, the client is free to open a new stream and send another (subscription) request (e.g. an HTTP update message) in the form of a (second) HEADERS Frame.

FIGS. 14 and 15 demonstrate how embodiments of the invention may be implemented on the basis of HTTP 2. As a further alternative to HTTP 2, embodiments of the invention may also be implemented using messages based on the WebSocket protocol, and using a WebSocket connection. WebSocket supports full duplex communication between a client and a server. Communication is performed using frames. A frame may contain text-based or binary payload data. The syntax and semantics of this data can be freely chosen by the application using the WebSocket protocol. As such, according to embodiments of the invention, a similar syntax as used for the HTTP 2 example may be adopted for the WebSocket based (subscription) request message. The payload of a WebSocket frame configured as a (subscription) request message according to embodiments of the invention could for example take the following form:

>subscription_id=3
>method=GET
>path=movie/movie_c{number}_q{bandwidth}.mp4
>number=2;1,2;2s
>bandwidth=1;1-3;0s In contrast to HTTP 2, a WebSocket message is not associated with a stream, as such a "subscription_id" variable was added to the payload of the message to associate a request with responses. The "subscription id" parameter may thus be used as (functions as) a session identifier according to embodiments of the invention. Similarly, a subscription cancel message may be defined, with for example the following syntax:

>subscription_id=3
>method=CANCEL

Likewise a WebSocket update message may be defined, with method=UPDATE and further comprising a newly defined collection of chunks (segments).

From the server (e.g. delivery node) side, segment data messages (e.g. containing the segment or chunk, also referred to as a (WebSocket) response message) could take the following form (syntax):

>subscription_id=3
>method=SEGMENT
>last_segment=1
><segment data>

The "last_segment" variable is optional and serves the same purpose as the END_STREAM bit in the HTTP 2 example.

The invention claimed is:

1. Method for requesting a plurality of chunks by an hypertext transfer protocol (HTTP) Adaptive Streaming client, on the basis of a single request message, said chunks being defined on the basis of a manifest file comprising chunk identifiers for determining at least one delivery node for delivering chunks defined by said chunk identifiers to said client, said method comprising:

determining, by said client, on the basis of said manifest file, a first plurality of chunks for being requested by said client, and determining a first request message for requesting said first plurality of chunks, said first request message comprising a first chunk template comprising one or more chunk template parameter fields and one or more first chunk template parameters, said first request message defining said first plurality of chunks;

sending said first request message to a first network node for determining a first plurality of chunk identifiers referencing said first plurality of chunks determined by said client and requested with said first request message, on the basis of said one or more first chunk template parameters and the first chunk template; and, receiving a plurality of response messages, each response message comprising a chunk associated with one of said chunk identifiers that were determined on the basis of said one or more first chunk template parameters of said first request message and said first chunk template.

2. The method according to claim 1 wherein determining said first request message comprises:
   determining said one or more first chunk template parameters on the basis of at least part of one or more chunk identifiers in said manifest file;
   each chunk template parameter being associated with at least one of:
   one or more chunk numbers or a range of chunk numbers, one or more chunk presentation times or a presentation time period, one or more chunk quality representations or a chunk quality presentation range, one or more chunk bitrates or a chunk bitrate range, one or more chunk sizes or a range of chunk sizes.

3. The method according to claim 1 wherein a request uniform resource locator (URL) of said first request message comprises said first chunk template and a resource location path associated with said at least one delivery node; and/or, wherein at least part of said one or more first chunk template parameters are added to said request message.

4. The method according to claim 1 wherein determining the first request message further comprises:
   inserting a session identifier in said first request message, said session identifier allowing said client and/or said network node to link said first request message to one or more further request messages and/or response messages.

5. The method according to claim 1 wherein said method further comprises:
   determining a second request message, wherein said second request message is configured for instructing said first network node to update at least part of said first plurality of chunk identifiers on the basis of a second plurality of chunk identifiers that are determined by said first network node on the basis of a second chunk template and one or more second chunk template parameters.

6. Computer program product, comprising software code portions configured for, when run in a memory of a computer, executing the method steps according to claim 1.

7. The method according to claim 1, wherein said first request message comprises one of an HTTP GET message, an HTTP HEADERS Frame message and a WebSocket-based message, and wherein at least one response message of the plurality of responses comprises an HTTP response message or a WebSocket-based response message.

8. The method according to claim 1, wherein said first network node comprises a delivery node or a cache.

9. The method according to claim 1, wherein said first plurality of chunk identifiers comprises a first plurality of URLs and said first chunk template comprises a URL chunk template.

10. The method according to claim 3, wherein said one or more chunk template parameters are inserted in the header of said first request message, inserted in said request URL; and/or, appended to said request as a query string.

11. The method according to claim 4, wherein said session identifier is added as a token to request URL or as a cookie value in a header of said first request message.

12. The method according to claim 5, wherein said second request message comprises an update parameter for instructing said first network node to update said first request message on the basis of the second request message.

13. A network node configured for delivering a plurality of chunks to at least one hypertext transfer protocol (HTTP) Adaptive Streaming client on the basis of a single request message, said network node comprising:
   at least one computer readable storage medium having computer readable program code embodied therewith, and
   at least one processor coupled to said computer readable storage medium, wherein responsive to executing the computer readable program code, said at least one processor is configured to perform executable operations comprising:
   receiving a first request message for requesting delivery of a first plurality of chunks to said client, said first request message defining said first plurality of chunks, which are determined by said client, said first request message comprising a first chunk template comprising one or more chunk template parameter fields and one or more first chunk template parameters;
   determining a first plurality of chunk identifiers referencing said first plurality of chunks on the basis of said one or more first chunk template parameters and the first chunk template; and,
   sending at least one response message to said client, said response message comprising a chunk associated with one of said chunk identifiers that were determined on the basis of said first chunk template and said one or more first chunk template parameters.

14. The network node according to claim 13 wherein said executable operations further comprise:
   receiving a second request message, wherein said second request message is configured for instructing said network node to update at least part of said first plurality of chunk identifiers on the basis of a second plurality of chunk identifiers that are determined by said first network node on the basis of a second chunk template and one or more second chunk template parameters.

15. The network node according to claim 13 wherein said executable operations further comprise:
   in response to said first request message, generating a response message associated with one or more chunks that cannot be delivered to said client by said first network node, said response message comprising a resource location path associated with a second network node that is capable of delivering said one or more chunks that cannot be delivered by said first network node; or,
   in response to said first request message, generating a second request message, associated with one or more chunks that cannot be delivered to said client by said first network node, said second request message comprising a resource location path associated with a second network node that is capable of delivering said one or more chunks that cannot be delivered by said first network node.

16. The network node according to claim 13, wherein said first plurality of chunk identifiers comprises a first plurality of URLs and said first chunk template comprises a URL chunk template.

17. The network node according to claim 13, wherein said first request message comprises an HTTP GET message.

18. The network node according to claim 14, wherein said second request message comprises an update parameter for instructing said first network node to update said first request message on the basis of the second request message.

19. A user device comprising an hypertext transfer protocol (HTTP) Adaptive Streaming client configured for requesting a plurality of chunks, on the basis of a single request message, said chunks being defined on the basis of a manifest file comprising chunk identifiers for determining at least one delivery node for delivering chunks defined by said chunk identifiers to said client, said user device comprising:
- a non transitory computer readable storage medium having computer readable program code embodied therewith, and
- a processor coupled to the computer readable storage medium, wherein responsive to executing the computer readable program code, the processor is configured to perform executable operations comprising:
- determining on the basis of said manifest file a first plurality of chunks for being requested and determining a first request message for requesting said first plurality of chunks, said first request message defining said first plurality of chunks, said first request message comprising a first chunk template comprising one or more chunk template parameter fields and one or more first chunk template parameters;
- sending said first request message to a first network node for determining a first plurality of chunk identifiers referencing said first plurality of chunks determined by said client and requested with said first request message, on the basis of said one or more first chunk template parameters and the first chunk template; and,
- receiving a plurality of response messages, each response message comprising a chunk associated with one of said chunk identifiers that were determined on the basis of said one or more first chunk template parameters of said first request message and said first chunk template; or,
- receiving at least one HTTP redirection message associated with one or more chunks that cannot be delivered to said client by said first network node, said HTTP redirection message comprising a resource location path associated with a second network node that is capable of delivering said one or more chunks that cannot be delivered by said first network node.

20. The user device according to claim 19 wherein the computer-readable storage medium stores at least part of the manifest file, wherein said manifest file comprises:
- chunk identifiers for determining at least one delivery node for delivering chunks defined by said chunk identifiers to said client;
- a subscription support parameter for indicating that said at least one delivery node is configured for determining the first plurality of chunk identifiers associated with said first plurality of chunks on the basis of said one or more first chunk template parameters and said first chunk template; and, sending at least one response message to said client, said response message comprising a chunk associated with one of said chunk identifiers that were determined on the basis of said first chunk template and said one or more first chunk template parameters; and,
- a subscription format parameter for instructing said client to replace at least part of said one or more chunk template parameter fields in the first chunk template of a request uniform resource locator (URL) of said single request message with at least part of said one or more chunk template parameters.

21. The user device according to claim 19, wherein said first network node comprises a delivery node or a cache.

22. The user device according to claim 19, wherein said first plurality of chunk identifiers comprises a first plurality of URLs and said first chunk template comprises a URL chunk template.

23. The user device according to claim 19, wherein said first request message comprises an HTTP GET message.

24. The user device according to claim 19, wherein said HTTP redirection message further comprises a redirection URL associated with said second network node, said redirection URL comprising said first chunk template and one or more second chunk template parameters for defining the one or more chunks that cannot be delivered by said first network node.

* * * * *